United States Patent
Madhani et al.

(10) Patent No.: US 11,938,922 B1
(45) Date of Patent: Mar. 26, 2024

(54) MOTION CONTROL SYSTEM

(71) Applicants: Akhil J. Madhani, Portola Valley, CA (US); Robin A. Auckland, Sunnyvale, CA (US); Giles D. Wood, Los Gatos, CA (US); Peteris K. Augenbergs, Woodside, CA (US); Xingchen Fan, Sunnyvale, CA (US); Jonathan L. Hall, Emerald Hills, CA (US); Paul J. Keas, San Jose, CA (US)

(72) Inventors: Akhil J. Madhani, Portola Valley, CA (US); Robin A. Auckland, Sunnyvale, CA (US); Giles D. Wood, Los Gatos, CA (US); Peteris K. Augenbergs, Woodside, CA (US); Xingchen Fan, Sunnyvale, CA (US); Jonathan L. Hall, Emerald Hills, CA (US); Paul J. Keas, San Jose, CA (US)

(73) Assignee: APPLE INC., Cupertino, CA (US)

( * ) Notice: Subject to any disclaimer, the term of this patent is extended or adjusted under 35 U.S.C. 154(b) by 439 days.

(21) Appl. No.: 17/021,571

(22) Filed: Sep. 15, 2020

Related U.S. Application Data

(60) Provisional application No. 62/904,167, filed on Sep. 23, 2019.

(51) Int. Cl.
*B60W 30/02* (2012.01)
*B60G 17/016* (2006.01)
(Continued)

(52) U.S. Cl.
CPC ........... *B60W 30/02* (2013.01); *B60G 17/016* (2013.01); *B60G 17/021* (2013.01); *B60G 17/04* (2013.01);
(Continued)

(58) Field of Classification Search
CPC ..... B60W 30/02; B60W 10/22; B60G 17/016; B60G 17/021; B60G 17/04; B60K 2001/0438
See application file for complete search history.

(56) References Cited

U.S. PATENT DOCUMENTS

| 2,757,938 A | 8/1956 | Crowder |
| 2,901,239 A | 8/1959 | Sethna |

(Continued)

FOREIGN PATENT DOCUMENTS

| CN | 108215946 A | 6/2018 |
| CN | 208439009 U | 1/2019 |

(Continued)

OTHER PUBLICATIONS

MONROE Intelligent Suspension, "CVSA2/KINETIC: Low Energy For High Performance", www.monroeintelligentsuspension.com/products/cvsa2-kinetic/, Date Unknown, Downloaded Mar. 2, 2017, 2 pp.

(Continued)

*Primary Examiner* — Frank B Vanaman
(74) *Attorney, Agent, or Firm* — Young Basile Hanlon & MacFarlane, P.C.

(57) ABSTRACT

A motion control system that includes a support motion control system and a body motion control system. The body motion control system includes passive motion control components and active motion control components.

22 Claims, 13 Drawing Sheets

(51) Int. Cl.
*B60G 17/02* (2006.01)
*B60G 17/04* (2006.01)
*B60K 1/04* (2019.01)
*B60W 10/20* (2006.01)
*B60W 10/22* (2006.01)

(52) U.S. Cl.
CPC .............. *B60K 1/04* (2013.01); *B60W 10/20* (2013.01); *B60W 10/22* (2013.01)

(56) References Cited

U.S. PATENT DOCUMENTS

| | | | |
|---|---|---|---|
| 2,913,252 A | 11/1959 | Norrie | |
| 3,089,710 A | 5/1963 | Fiala | |
| 3,236,334 A | 2/1966 | Wallerstein, Jr. | |
| 3,322,379 A | 5/1967 | Flannelly | |
| 3,368,824 A | 2/1968 | Julien | |
| 3,441,238 A | 4/1969 | Flannelly | |
| 3,781,032 A | 12/1973 | Jones | |
| 3,970,162 A | 7/1976 | Le Salver et al. | |
| 4,206,935 A | 6/1980 | Sheppard et al. | |
| 4,339,015 A * | 7/1982 | Fowkes ................... | B60L 50/62 180/68.5 |
| 4,379,572 A | 4/1983 | Hedenberg | |
| 4,530,514 A | 7/1985 | Ito | |
| 4,537,420 A | 8/1985 | Ito et al. | |
| 4,589,678 A | 5/1986 | Lund | |
| 4,613,152 A | 9/1986 | Booher | |
| 4,614,359 A | 9/1986 | Lundin et al. | |
| 4,634,142 A | 1/1987 | Woods et al. | |
| 4,637,628 A | 1/1987 | Perkins | |
| 4,643,270 A | 2/1987 | Beer | |
| 4,659,106 A | 4/1987 | Fujita et al. | |
| 4,784,378 A | 11/1988 | Ford | |
| 4,834,416 A | 5/1989 | Shimoe et al. | |
| 4,893,832 A | 1/1990 | Booher | |
| 4,922,159 A | 5/1990 | Phillips et al. | |
| 4,960,290 A | 10/1990 | Bose | |
| 4,981,309 A | 1/1991 | Froeschle et al. | |
| 4,991,698 A | 2/1991 | Hanson | |
| 5,033,028 A | 7/1991 | Browning | |
| 5,060,959 A | 10/1991 | Davis et al. | |
| 5,165,838 A * | 11/1992 | Kallansrude ............ | B60G 17/04 414/535 |
| 5,172,930 A | 12/1992 | Boye et al. | |
| 5,244,053 A | 9/1993 | Kashiwagi | |
| 5,251,926 A | 10/1993 | Aulerich et al. | |
| 5,364,081 A | 11/1994 | Hartl | |
| 5,401,053 A | 3/1995 | Sahm et al. | |
| 5,409,254 A | 4/1995 | Minor et al. | |
| 5,468,055 A | 11/1995 | Simon et al. | |
| 5,507,518 A | 4/1996 | Nakahara et al. | |
| 5,517,414 A | 5/1996 | Hrovat | |
| 5,645,250 A | 7/1997 | Gevers | |
| 5,678,847 A | 10/1997 | Izawa et al. | |
| 5,785,345 A | 7/1998 | Barlas et al. | |
| 5,810,335 A | 9/1998 | Wirtz et al. | |
| 5,829,764 A | 11/1998 | Griffiths | |
| 5,880,542 A | 3/1999 | Leary et al. | |
| 6,032,770 A | 3/2000 | Alcone et al. | |
| 6,113,119 A | 9/2000 | Laurent et al. | |
| 6,142,494 A | 11/2000 | Higuchi | |
| 6,170,838 B1 | 1/2001 | Laurent et al. | |
| 6,233,510 B1 | 5/2001 | Platner et al. | |
| 6,249,728 B1 | 6/2001 | Streiter | |
| 6,276,710 B1 | 8/2001 | Sutton | |
| 6,293,561 B1 * | 9/2001 | Goetzen ................. | B62D 17/00 280/86.757 |
| 6,314,353 B1 | 11/2001 | Ohsaku et al. | |
| 6,357,770 B1 | 3/2002 | Carpiaux et al. | |
| 6,364,078 B1 | 4/2002 | Parison et al. | |
| 6,443,436 B1 | 9/2002 | Schel | |
| 6,470,248 B2 | 10/2002 | Shank et al. | |
| 6,502,837 B1 | 1/2003 | Hamilton et al. | |
| 6,513,819 B1 | 2/2003 | Oliver et al. | |
| 6,634,445 B2 | 10/2003 | Dix et al. | |
| 6,637,561 B1 | 10/2003 | Collins et al. | |
| 6,702,265 B1 * | 3/2004 | Zapletal .................. | B60G 5/00 267/187 |
| 6,873,891 B2 | 3/2005 | Moser et al. | |
| 6,926,288 B2 | 8/2005 | Bender | |
| 6,940,248 B2 | 9/2005 | Maresca et al. | |
| 6,945,541 B2 | 9/2005 | Brown | |
| 7,017,690 B2 | 3/2006 | Burke | |
| 7,032,723 B2 | 4/2006 | Quaglia et al. | |
| 7,051,851 B2 | 5/2006 | Svartz et al. | |
| 7,140,601 B2 | 11/2006 | Nesbitt et al. | |
| 7,195,250 B2 | 3/2007 | Knox et al. | |
| 7,202,577 B2 | 4/2007 | Parison et al. | |
| 7,302,825 B2 | 12/2007 | Knox | |
| 7,308,351 B2 | 12/2007 | Knoop et al. | |
| 7,392,997 B2 | 7/2008 | Sanville et al. | |
| 7,401,794 B2 | 7/2008 | Laurent et al. | |
| 7,421,954 B2 | 9/2008 | Bose | |
| 7,427,072 B2 | 9/2008 | Brown | |
| 7,484,744 B2 | 2/2009 | Galazin et al. | |
| 7,502,589 B2 | 3/2009 | Howard et al. | |
| 7,543,779 B1 * | 6/2009 | Lewis .................... | B64G 1/646 244/172.4 |
| 7,543,825 B2 | 6/2009 | Yamada | |
| 7,551,749 B2 | 6/2009 | Rosen et al. | |
| 7,641,010 B2 | 1/2010 | Mizutani et al. | |
| 7,644,938 B2 | 1/2010 | Yamada | |
| 7,654,540 B2 | 2/2010 | Parison et al. | |
| 7,818,109 B2 | 10/2010 | Scully | |
| 7,823,891 B2 | 11/2010 | Bushko et al. | |
| 7,932,684 B2 | 4/2011 | O'Day et al. | |
| 7,962,261 B2 | 6/2011 | Bushko et al. | |
| 7,963,529 B2 | 6/2011 | Oteman et al. | |
| 7,976,038 B2 | 7/2011 | Gregg | |
| 8,047,551 B2 | 11/2011 | Morris et al. | |
| 8,067,863 B2 | 11/2011 | Giovanardi | |
| 8,095,268 B2 | 1/2012 | Parison et al. | |
| 8,099,213 B2 | 1/2012 | Zhang et al. | |
| 8,109,371 B2 | 2/2012 | Kondo et al. | |
| 8,112,198 B2 | 2/2012 | Parison, Jr. et al. | |
| 8,113,522 B2 | 2/2012 | Oteman et al. | |
| 8,127,900 B2 | 3/2012 | Inoue | |
| 8,157,036 B2 | 4/2012 | Yogo et al. | |
| 8,191,874 B2 | 6/2012 | Inoue et al. | |
| 8,282,149 B2 | 10/2012 | Kniffin et al. | |
| 8,336,319 B2 | 12/2012 | Johnston et al. | |
| 8,356,861 B2 | 1/2013 | Kniffin et al. | |
| 8,360,387 B2 | 1/2013 | Breen et al. | |
| 8,370,022 B2 | 2/2013 | Inoue et al. | |
| 8,387,762 B2 | 3/2013 | Kondo et al. | |
| 8,417,417 B2 | 4/2013 | Chen et al. | |
| 8,428,305 B2 | 4/2013 | Zhang et al. | |
| 8,466,639 B2 | 6/2013 | Parison, Jr. et al. | |
| 8,490,761 B2 | 7/2013 | Kondo | |
| 8,499,903 B2 | 8/2013 | Sakuta et al. | |
| 8,548,678 B2 | 10/2013 | Ummethala et al. | |
| 8,579,311 B2 | 11/2013 | Butlin, Jr. et al. | |
| 8,632,078 B2 | 1/2014 | Ehrlich et al. | |
| 8,641,052 B2 | 2/2014 | Kondo et al. | |
| 8,641,053 B2 | 2/2014 | Pare et al. | |
| 8,668,060 B2 | 3/2014 | Kondo et al. | |
| 8,682,530 B2 | 3/2014 | Nakamura | |
| 8,701,845 B2 | 4/2014 | Kondo | |
| 8,725,351 B1 | 5/2014 | Selden et al. | |
| 8,744,680 B2 | 6/2014 | Rieger et al. | |
| 8,744,694 B2 | 6/2014 | Ystueta | |
| 8,757,309 B2 | 6/2014 | Schmitt et al. | |
| 8,783,430 B2 | 7/2014 | Brown | |
| 8,890,461 B2 | 11/2014 | Knox et al. | |
| 8,930,074 B1 | 1/2015 | Lin | |
| 8,938,333 B2 | 1/2015 | Bose et al. | |
| 9,062,983 B2 | 6/2015 | Zych | |
| 9,079,473 B2 | 7/2015 | Lee et al. | |
| 9,102,209 B2 | 8/2015 | Giovanardi et al. | |
| 9,291,300 B2 | 3/2016 | Parker et al. | |
| 9,316,667 B2 | 4/2016 | Ummethala et al. | |
| 9,349,304 B2 | 5/2016 | Sangermano, II et al. | |
| 9,399,384 B2 | 7/2016 | Lee et al. | |

(56) References Cited

U.S. PATENT DOCUMENTS

| | | |
|---|---|---|
| 9,428,029 B2 | 8/2016 | Job |
| 9,533,539 B2 | 1/2017 | Eng et al. |
| 9,550,495 B2 | 1/2017 | Tatourian et al. |
| 9,625,902 B2 | 4/2017 | Knox |
| 9,643,467 B2 | 5/2017 | Selden et al. |
| 9,702,349 B2 | 7/2017 | Anderson et al. |
| 9,855,887 B1 | 1/2018 | Potter et al. |
| 9,868,332 B2 | 1/2018 | Anderson et al. |
| 9,975,391 B2 | 5/2018 | Tseng et al. |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,407,035 B1 | 9/2019 | Gadda et al. |
| 10,513,161 B2 | 12/2019 | Anderson et al. |
| 2001/0045719 A1 | 11/2001 | Smith |
| 2002/0190486 A1 | 12/2002 | Phillis et al. |
| 2003/0030241 A1 | 2/2003 | Lawson |
| 2003/0080526 A1 | 5/2003 | Conover |
| 2004/0054455 A1 | 3/2004 | Voight et al. |
| 2004/0074720 A1 | 4/2004 | Thieltges |
| 2004/0094912 A1 | 5/2004 | Niwa et al. |
| 2004/0226788 A1 | 11/2004 | Tanner |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0035074 A1* | 2/2007 | Vervoordeldonk ............ B60G 17/0152 267/140.11 |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0152409 A1* | 7/2007 | Robbins ............ B60G 17/052 280/5.514 |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0054540 A1* | 3/2008 | Buma ............ B60G 17/0162 267/195 |
| 2008/0100020 A1 | 5/2008 | Gashi et al. |
| 2008/0164111 A1 | 7/2008 | Inoue et al. |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0152034 A1* | 6/2009 | Takasaki ............ B60L 50/52 180/68.5 |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0234551 A1* | 9/2009 | Aswani ............ B60W 30/02 701/70 |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0207344 A1 | 8/2010 | Nakamura |
| 2010/0222960 A1 | 9/2010 | Oida et al. |
| 2010/0252376 A1 | 10/2010 | Chern et al. |
| 2010/0253019 A1 | 10/2010 | Ogawa |
| 2011/0115183 A1 | 5/2011 | Alesso et al. |
| 2011/0276233 A1* | 11/2011 | Lofstrand ............ A61G 5/1075 5/608 |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0253764 A1 | 9/2013 | Kikuchi et al. |
| 2013/0341143 A1 | 12/2013 | Brown |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2015/0343876 A1 | 12/2015 | Yoshizawa et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0291574 A1 | 10/2016 | Parison |
| 2016/0339823 A1 | 11/2016 | Smith et al. |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0210192 A1* | 7/2017 | Reybrouck ......... B60W 30/085 |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0056748 A1 | 3/2018 | Grimes |
| 2018/0079272 A1 | 3/2018 | Aikin |
| 2018/0089901 A1 | 3/2018 | Rober et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |
| 2018/0162187 A1 | 6/2018 | Trangbaek |
| 2018/0195570 A1 | 7/2018 | Churchill et al. |
| 2018/0208009 A1 | 7/2018 | McGuire et al. |
| 2018/0222274 A1 | 8/2018 | Davis et al. |
| 2018/0297587 A1 | 10/2018 | Kasaiezadeh Mahabadi et al. |
| 2018/0345747 A1 | 12/2018 | Boon et al. |
| 2018/0370314 A1 | 12/2018 | Higle |
| 2019/0023094 A1 | 1/2019 | Panagis et al. |
| 2019/0118604 A1 | 4/2019 | Suplin et al. |
| 2019/0248203 A1 | 8/2019 | Krehmer et al. |
| 2019/0308484 A1 | 10/2019 | Belter et al. |

(56) References Cited

U.S. PATENT DOCUMENTS

| | | | |
|---|---|---|---|
| 2020/0088214 A1 | 3/2020 | Woodard et al. | |
| 2020/0171907 A1 | 6/2020 | Hall et al. | |
| 2020/0180386 A1 | 6/2020 | Tabata et al. | |
| 2020/0216128 A1 | 7/2020 | Doerksen | |
| 2020/0317017 A1* | 10/2020 | Nobutoki | B62D 24/00 |
| 2021/0061046 A1 | 3/2021 | Simon et al. | |

FOREIGN PATENT DOCUMENTS

| | | |
|---|---|---|
| DE | 19853876 A1 | 5/2000 |
| DE | 19850169 C1 | 7/2000 |
| DE | 102009060213 A1 | 6/2011 |
| DE | 102010041404 A1 | 3/2012 |
| DE | 202012002846 U1 | 7/2012 |
| DE | 102015003530 A1 | 9/2016 |
| DE | 102016000686 A1 | 7/2017 |
| DE | 102018208774 A1 | 12/2019 |
| EP | 1693233 B1 | 4/2009 |
| EP | 2072855 A1 | 6/2009 |
| EP | 2233330 B1 | 2/2013 |
| EP | 3088230 A1 | 11/2016 |
| GB | 2220625 A | 1/1990 |
| GB | 2437633 A | 10/2007 |
| JP | 2004155258 A | 6/2004 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 101509600 B1 | 4/2015 |
| KR | 20170095073 A | 8/2017 |
| WO | 9304883 A1 | 3/1993 |
| WO | 2011148792 A1 | 12/2011 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

* cited by examiner

US 11,938,922 B1

MOTION CONTROL SYSTEM

CROSS-REFERENCE TO RELATED APPLICATIONS

This application claims the benefit of U.S. Provisional Application No. 62/904,167, filed on Sep. 23, 2019, the content of which is hereby incorporated by reference herein for all purposes.

TECHNICAL FIELD

The application relates generally to motion control systems.

BACKGROUND

Motion control systems are typically classified as passive motion control systems or active motion control systems. The motion control system isolates a "sprung mass," from an "unsprung mass." The motion control system attempts to isolate the sprung mass from vibrations that are experienced by the unsprung mass. A passive motion control system uses components such as springs and dampers (e.g., gas or liquid filled dampers) to isolate the sprung mass from the unsprung mass. Thus, passive motion control components function to remove energy from the system. An active motion control system uses components that output forces having a controlled magnitude and direction that is determined based on information received from sensors. Active motion control systems are able to add energy to the system and are able to remove energy from the system.

SUMMARY

One aspect of the disclosure is a vehicle that includes wheel and tire assemblies, a chassis, a body, a chassis suspension system that connects the chassis to the wheel and tire assemblies, and a body suspension system that connects the body to the chassis. The body suspension system includes passive suspension components that support the body with respect to the chassis and active suspension components that control motion of the body with respect to the chassis. The body suspension system is configured to move the body with respect to the chassis in three linear degrees of freedom and three rotational degrees of freedom.

In some implementations of the vehicle, the active suspension components of the body suspension system include six or more active suspension actuators that are connected to the body and the chassis. In some implementations of the vehicle, the active suspension components of the body suspension system include linear actuators that are connected to the body and the chassis.

In some implementations of the vehicle, the active suspension components of the body suspension system include a ball screw actuator that advances and retracts an output shaft along a line of action by rotation of an electric motor. In some implementations of the vehicle, the active suspension components of the body suspension system include a linear electric actuator that advances and retracts an output shaft along a line of action using a linear electric motor. In some implementations of the vehicle, the active suspension components of the body suspension system include an electric motor and a connecting rod that is eccentrically coupled to a rotational output of the electric motor.

In some implementations of the vehicle, the chassis suspension system includes passive suspension components that are configured to dampen vibrations. In some implementations of the vehicle, the chassis suspension system includes active suspension components that are configured to control motion of the chassis with respect to the wheel and tire assemblies.

In some implementations of the vehicle, the body defines a passenger compartment that is configured to carry passengers. In some implementations of the vehicle, the body includes doors that allow for ingress and egress. In some implementations of the vehicle, the chassis includes a battery box that holds battery cells, a primary frame portion that supports the battery box, and one or more electric propulsion motors that are powered by electrical power that is supplied by the battery cells.

Another aspect of the disclosure is a vehicle that includes wheel and tire assemblies, a chassis, and a body. The chassis includes a frame, a battery box that contains battery cells, and one or more electric propulsion motors that are powered by electrical power that is supplied by the battery cells. The body that defines a passenger compartment, includes exterior panels, and includes a door. A first group of passive suspension components support the chassis with respect to the wheel and tire assemblies. A second group of passive suspension components support the body with respect to the chassis. The vehicle also includes active suspension components that are operable to control motion of the body with respect to the chassis in three linear degrees of freedom and three rotational degrees of freedom. The vehicle also includes sensors that output motion signals that describe motion of the body and motion of the chassis. The vehicle also includes a controller that determines control signals for the active suspension components based on the motion signals from the sensors and causes the active suspension components to control motion of the body using the control signals. In some implementations, the active suspension components are configured to dampen low-frequency motions. The active suspension components may include six or more active suspension actuators that are connected to the body and the chassis. The active suspension components may include linear actuators that are connected to the body and the chassis. The second group of passive suspension components may include air springs.

Another aspect of the disclosure is a vehicle that includes a chassis, a body, and a body suspension system. The chassis includes a frame, a battery box that contains battery cells, and one or more electric propulsion motors that are powered by electrical power that is supplied by the battery cells. The body defines a passenger compartment, the body includes exterior panels, and the body includes a door. The body suspension system connects the body to the chassis. The body suspension system includes actuator assemblies that each include an actuator and a connecting rod. Each actuator is connected to the chassis and is positioned below a top surface of the chassis. Each connecting rod that is connected to the respective actuator and is connected to the body.

The vehicle may also include wheel and tire assemblies, a first group of passive suspension components that support the chassis with respect to the wheel and tire assemblies, and a second group of passive suspension components that support the body with respect to the chassis. The second group of passive suspension components may include air springs. The actuator assemblies may be operable to control motion of the body with respect to the chassis in three linear degrees of freedom and three rotational degrees of freedom.

The vehicle may include sensors and a controller. The sensors output motion signals that describe motion of the body and motion of the chassis. The controller determines control signals for the body suspension system based on the motion signals from the sensors and causes the body suspension system to control motion of the body using the control signals.

DETAILED DESCRIPTION

The description herein relates to suspension architectures for vehicles that include a chassis suspension system and a body suspension system. The chassis suspension system isolates the chassis from the unsprung mass (e.g., wheels, tires, and related components) of the vehicle. The body suspension system isolates the body of the vehicle, inclusive of the passenger compartment of the vehicle, from the chassis of the vehicle. As used herein, the term "isolate" means that, during normal operating conditions (e.g., when the dynamic limits of the suspension systems are not exceeded), all load paths between the structures are routed through suspension components that control vibrations as opposed to direct transmission of forces through direct load paths.

In common active suspension designs, the primary suspension components (spring/damper) are replaced by active components that are able to add and remove energy. Using a suspension architecture in which the primary suspension components are replaced, the vehicle body architecture can remain largely unchanged, as can the suspension itself. This approach allows adoption of active suspension technologies without redesign of existing vehicle platforms. To perfectly isolate the vehicle body relative to the wheels and tires, the required actuator performance capabilities are very high. In addition, if damping elements are placed between the vehicle body and the wheel knuckles as in conventional passive suspension system, velocity-dependent loads would be transmitted to the active suspension components. If such a design is used, wheel damping devices can be included (e.g., a reaction mass actuator or a tuned mass damper) to reduce the transmission of road disturbances into the body, which adds components to the system.

The disclosure herein includes vehicles that isolate a body of a vehicle (e.g., inclusive of a passenger compartment) relative to a chassis of the vehicle. Some implementations include a chassis suspension system that isolates the chassis of the vehicle from wheels and tires of the vehicle in combination with a body suspension system that isolates the body of the vehicle from the chassis of the vehicle.

As used herein, the term "high-frequency motion" refers to motion having a frequency that is greater than a natural frequency of the sprung mass. As used herein, the term "low-frequency motion" refers to motion having a frequency that is lower than the natural frequency of the sprung mass.

Figure 1:
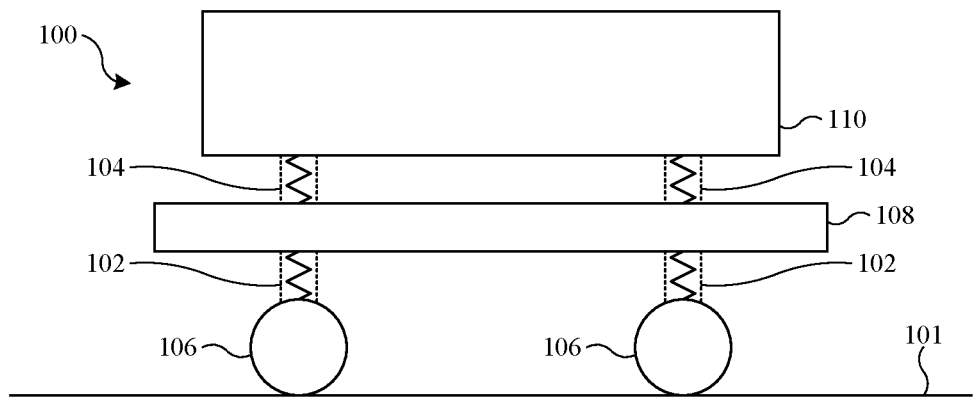
FIG. 1 is a side view illustration that shows a vehicle that includes a chassis suspension system and a body suspension system according to a first implementation.

FIG. 1 is a side view illustration that shows a vehicle 100 that includes a chassis suspension system 102 and a body suspension system 104. The vehicle 100 also includes wheel and tire assemblies 106, a chassis 108, and a body 110. The configuration shown in FIG. 1 and the descriptions of the components that are included in the vehicle 100 are generally applicable to all of the implementations that are described herein except as stated otherwise.

The vehicle 100 may be configured as a conventional road-going vehicle. As examples, the vehicle 100 may be configured as a passenger car, a utility vehicle, a sport utility vehicle, a truck, a bus, or a trailer. The vehicle 100 may include various actuator systems in addition to the chassis suspension system 102 and the body suspension system 104. As examples, the vehicle 100 may include a propulsion system, a braking system, and a steering system, which are not shown in FIG. 1.

The chassis suspension system 102 suspends the sprung mass of the vehicle 100 relative to the unsprung mass of the vehicle 100. In the illustrated example, the unsprung mass of the vehicle includes the wheel and tire assemblies 106, and the sprung mass of the vehicle includes the body suspension system 104, the chassis 108, and the body 110. Thus, the chassis suspension system 102 includes components that are connected to the wheel and tire assemblies 106 and to the chassis 108. The components that are included in the chassis suspension system 102 define isolated load paths between the wheel and tire assemblies 106 to the chassis 108. The body 110 is not directly connected to the wheel and tire assemblies 106 and instead is connected indirectly through the chassis 108.

The chassis suspension system 102 includes multiple components that connect the wheel and tire assemblies 106

(and other unsprung components) to the chassis 108. As will be explained further herein, the chassis suspension system may include purely passive suspension components, or may include active suspension components. Components that may be included in the chassis suspension system 102 include springs, shock absorbers, passive air springs, coil springs that have a low spring constant, active air springs, linear actuators, and bushings.

As used herein, the term "passive suspension components" refers to components that are configured to apply forces in opposition to applied forces and thereby remove energy from the system. As used herein, the term "active suspension components" includes suspension actuators that are able to apply actively-controlled forces independent of the velocity of the unsprung mass in addition to resisting (damping) forces that are applied to the suspension component as opposed to only resisting applied forces. Active suspension components are able to either remove energy from the system or to add energy to the system. Passive dampers can actively control the damping force, for example. The term "active suspension components" is therefore not intended to encompass controllable variable rate dampers that allow the damping rate to be changed, but are not able of adding energy to the system, and may only remove and dissipate energy from the system.

In some implementations of the vehicle 100, the chassis suspension system 102 includes passive suspension components that are configured to dampen vibrations. The chassis suspension system 102 may include, in addition to or instead of passive suspension components, active suspension components that are configured to control motion of the chassis with respect to the wheel and tire assemblies 106.

The body suspension system 104 suspends the body 110 relative to the chassis 108. The sprung mass of the vehicle 100 therefore includes two portions, a first portion including the chassis 108 and components connected to it, and a second portion including the body 110 and components connected to it, with the two portions of the sprung mass being connected to each other by the body suspension system 104. As will be explained further herein, the body suspension system 104 is configured to move the body 110 with respect to the chassis 108 by applying forces between the body 110 and the chassis 108 in response to control signals that are determined based on motion of the vehicle 100 and the chassis 108. As an example, the body suspension system 104 may be configured to control motion of the body 110 relative to the chassis 108 in three linear degrees of freedom and three rotational degrees of freedom.

The body suspension system 104 includes components that are connected to the chassis 108 and to the body 110. The components that are included in the chassis suspension system 102 define isolated load paths between the chassis 108 and the body 110. The body 110 is not directly connected to the wheel and tire assemblies 106 and instead is connected indirectly through the chassis 108.

The body suspension system 104 is connected to the body 110 such that all portions of the body 110 and components located in it are affected equally by motion of the body 110 relative to the chassis 108 that is caused by the body suspension system 104. For example, active suspension forces may be applied to control motion of the body 110 relative to the chassis 108 (e.g., to cancel low-frequency motion of the body 110 relative to the chassis 108).

Figure 19:
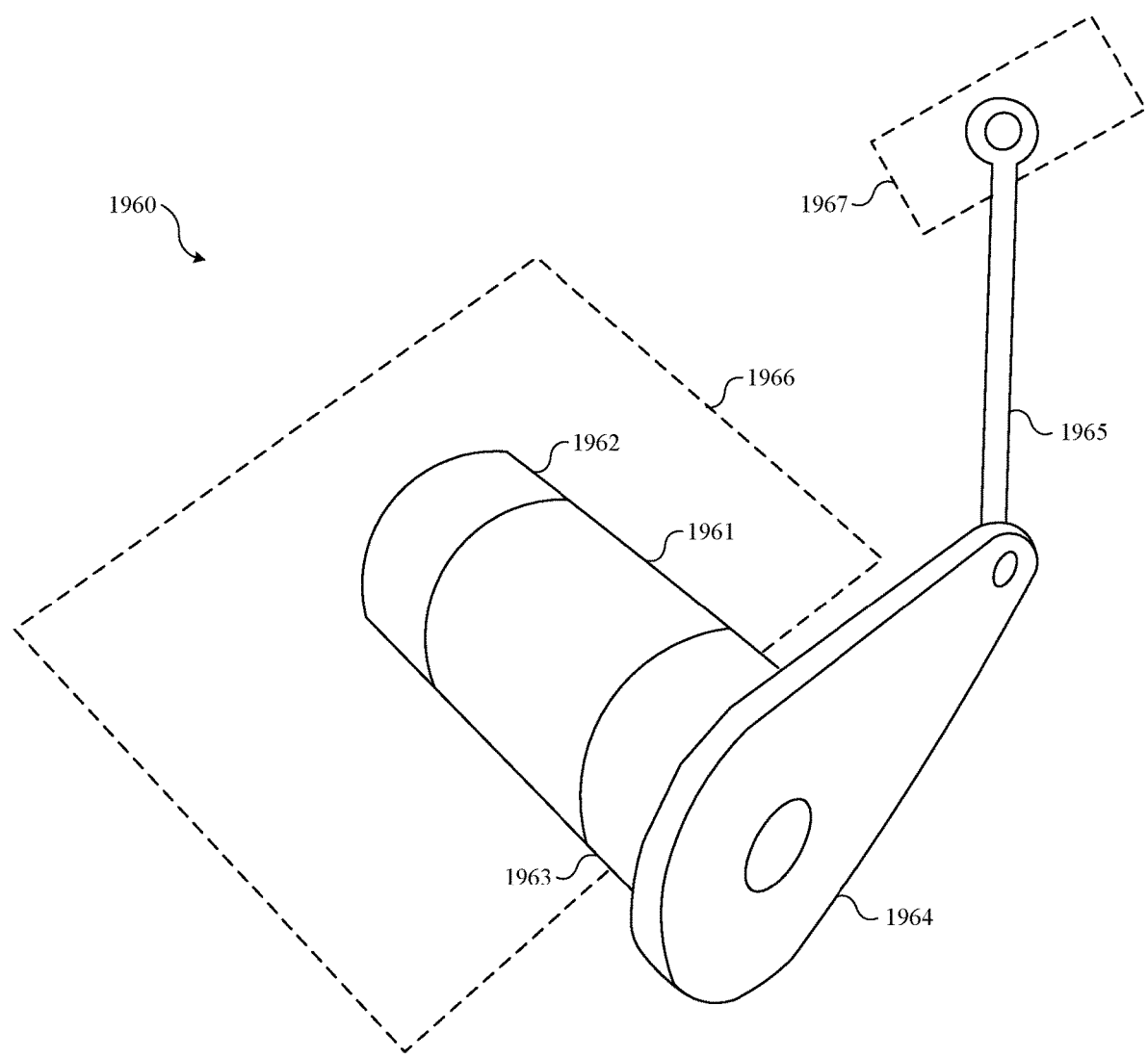
FIG. 19 is an illustration that shows an active suspension actuator assembly according to an example.

The body suspension system 104 may include active suspension components. The active suspension components of the body suspension system 104 may include six or more active suspension actuators that are connected to the body 110 and the chassis 108. Inclusion of six or more active suspension actuators in the body suspension system 104 allows the body suspension system 104 to be configured to control motion of the body 110 with respect to the chassis 108 in three linear degrees of freedom and in three rotational degrees of freedom. As one example, the active suspension components of the body suspension system 104 may include linear actuators that are connected to the body 110 and the chassis 108. As another example, the active suspension components of the body suspension system 104 may include a ball screw actuator that advances and retracts an output shaft along a line of action by rotation of an electric motor. As another example, the active suspension components of the body suspension system 104 may include a linear electric actuator that advances and retracts an output shaft along a line of action using a linear electric motor. As another example, the active suspension components of the body suspension system 104 may include a rotary actuator and link (e.g., as shown in FIG. 19) as an option, either with or without speed reduction. The link may be connected eccentrically with respect to the rotation axis of the rotary actuator. Speed reduction may be implemented using a planetary gear, offset gears, a harmonic drive, a belt drive, an epicyclic drive, etc.

The wheel and tire assemblies 106 include unsprung components of the vehicle 100 that support the vehicle 100 with respect to a surface 101, such as a road surface. The wheel and tire assemblies 106 may include wheels, tires (e.g., pneumatic tires), wheel hubs, braking components, steering components (e.g., steering linkages and/or hub mounted steering components), suspension linkages, propulsion linkages (e.g., in implementations that include chassis-mounted propulsion motors), and/or propulsion motors (e.g., in implementations that include hub motors).

The chassis 108 is the primary structure of the vehicle 100 that supports all other vehicle components and is directly supported by the wheel and tire assemblies 106. The chassis 108 may include a frame and vehicle components that are supported by the frame. Examples of the vehicle components that are supported by the frame include an energy source (e.g., a fuel tank or batter pack), propulsion system components (e.g., an internal combustion engine and/or electric motors), charging system components, thermal system components (e.g., for propulsion system cooling and passenger compartment heating and cooling), and vehicle control systems, which may include computing systems that provide automated vehicle control functions.

Figure 2:
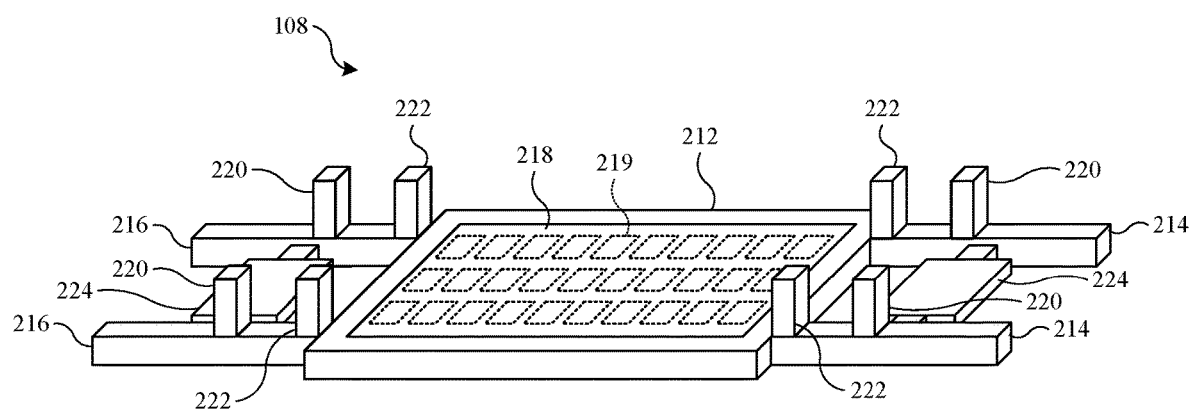
FIG. 2 is an illustration that shows an example of a chassis.

FIG. 2 is an illustration that shows an example of the chassis 108. The configuration of the chassis 108 that is shown in this example is commonly referred to as a "skateboard" chassis for a battery-electric vehicle. In the illustrated implementation, the chassis 108 includes a primary frame portion 212, front frame rails 214, and rear frame rails 216. The primary frame portion 212 supports a battery box 218 that holds battery cells 219. In the illustrated example, the primary frame portion 212 has a generally rectangular configuration defined by linear frame sections that surround the battery box 218. The battery box 218 serves as a supplemental frame member that adds strength to the chassis 108. The battery box 218, in the illustrated example, has a generally flat configuration that has a height that is generally equivalent to the height of the primary frame portion 212.

The front frame rails 214 are connected to a front end of the primary frame portion 212 and/or the battery box 218. The rear frame rails 216 are connected to a rear end of the primary frame portion 212 and/or the battery box 218. The front frame rails 214 and the rear frame rails 216 are configured as crushable members that are intended to absorb energy during an impact. For example, the front frame rails 214 and the rear frame rails 216 may extend in a longitudinal (front-to-rear) direction of the vehicle 100.

The chassis 108 may include chassis suspension mounts 220 that are configured to be attached to components of the chassis suspension system 102. The chassis 108 may include body suspension mounts 222 that are configured to be attached to components of the body suspension system 104. The body suspension mounts 222 may be connect to the primary frame portion 212, the front frame rails 214, and/or the rear frame rails 216 in any desired configuration. In some implementations, transmission of vibrations from the chassis 108 to the body 110 can be minimized by placing the body suspension mounts 222 at nodal points (e.g., points of inflection between upward and downward deflection) of the chassis 108.

The chassis 108 may include propulsion system components. For example, the chassis 108 may include one or more electric propulsion motors 224. For example, the electric propulsion motors 224 may be supported by the front frame rails 214 and/or by the rear frame rails 216. Thus, in some implementations of the vehicle 100, the chassis 108 includes the battery box 218 that holds the battery cells 219, the primary frame portion 212 that supports the battery box 218, and one or more electric propulsion motors, such as the electric propulsion motors 224, that are powered by electrical power that is supplied by the battery cells 219.

Figure 3:
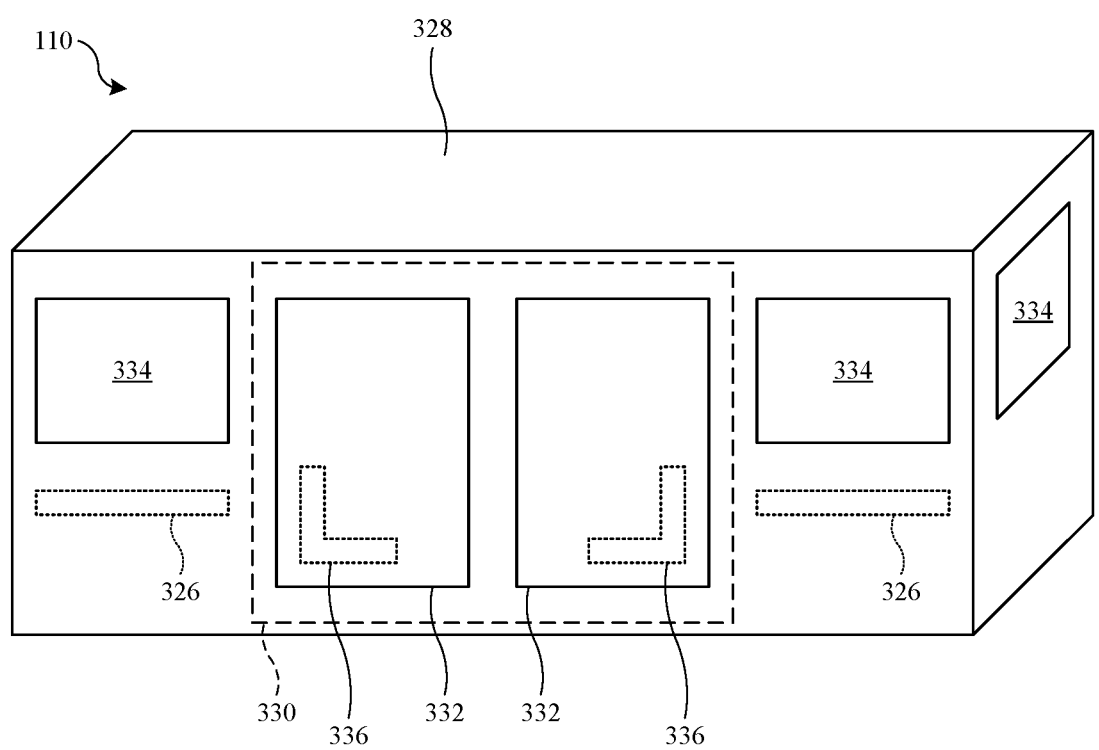
FIG. 3 is an illustration that shows an example of a body.

FIG. 3 is an illustration that shows an example of the body 110. The body 110 includes structural portions 326 and aesthetic portions 328. The body 110 may also define a passenger compartment 330. The structural portions 326 may be internal or external components that provide structural support to other portions of the body 110 and/or provide attachment points at which the body suspension system 104 is connected to the body 110. The structural portions 326 also include structures that protect the structural integrity of the passenger compartment 330 to avoid intrusion and improve occupant protection during rollover. The aesthetic portions 328 are exposed and viewable from the exterior of the vehicle 100 and/or from inside the body 110. The aesthetic portions 328 include exterior body panels of the vehicle 100 that define the overall shape and ornamental design features of the body 110 of the vehicle 100.

The passenger compartment 330 is an internal space within the body 110 that is the part of the vehicle 100 that is configured to carry passengers and cargo. As an example, the passenger compartment 330 may be accessible through doors 332 that are movable between open and closed positions. The body 110 may include windows 334 that admit light into the passenger compartment 330. Seats 336 may be located inside of the passenger compartment 330 to accommodate passengers. Thus, in some implementations of the vehicle 100, the body 110 defines the passenger compartment 330 that is configured to carry passengers, the body 110 may include doors 332 that allow for ingress and egress, and the body 110 may include windows 334 that admit light. In some implementations, the passenger compartment 330 is omitted, for example, in favor of a dedicated cargo compartment, in which case the suspension systems described herein may be applied, for example, in vehicles that carry vibration-sensitive cargo.

It will be appreciated that multiple implementations and variations of the vehicle 100 are possible. For example, the vehicle 100 may include the wheel and tire assemblies 106, the chassis 108, the body 110, the chassis suspension system 102, and the body suspension system 104. In a first implementation, the chassis suspension system 102 is a purely passive suspension system that includes no active components that are able to apply forces between the wheel and tire assemblies 106 and the chassis 108, and the body suspension system 104 includes passive components to support the body 110 relative to the chassis 108 as well as active suspension components that control motion of the body 110 relative to the chassis 108. In a second implementation, both the chassis suspension system 102 and the body suspension system 104 include passive suspension components and active suspension components. In a third implementation, the chassis suspension system 102 includes passive suspension components and active suspension components while the body suspension system 104 includes only passive suspension system components.

Figure 4:
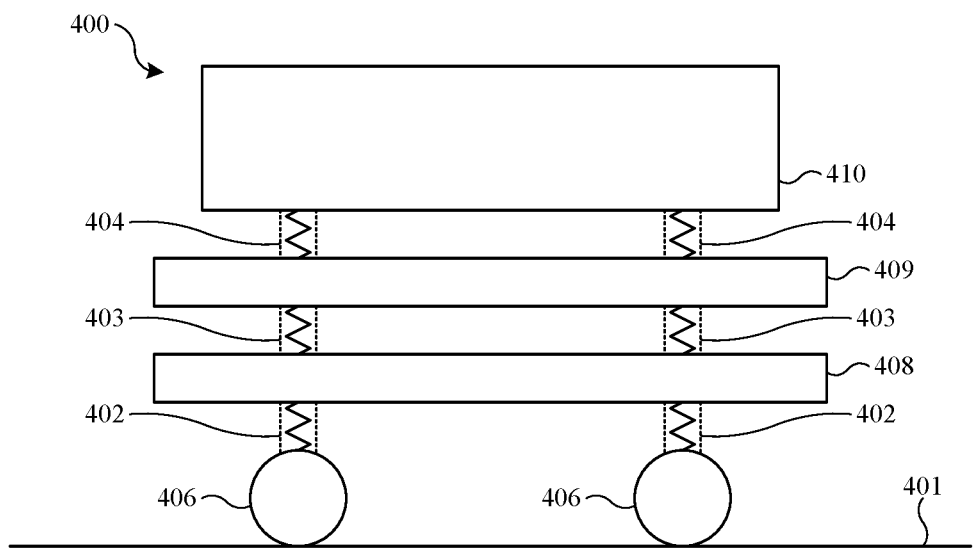
FIG. 4 is a side view illustration that shows a vehicle according to a second implementation that includes a chassis suspension system, and intermediate suspension system, and a body suspension system.

FIG. 4 is a side view illustration that shows a vehicle 400 according to an alternative implementation. The vehicle 400 includes a chassis suspension system 402, an intermediate suspension system 403, and a body suspension system 404. The vehicle 400 also includes wheel and tire assemblies 406 that support the vehicle 400 with respect to a surface 401. The chassis suspension system 402 connects the wheel and tire assemblies 406 to a chassis 408. The intermediate suspension system 403 connects the chassis 408 to an intermediate platform 409. The body suspension system connects the intermediate platform 409 to a body 410.

The chassis suspension system 402 is implemented in the manner described with respect to the chassis suspension system 402 except that it is connected to the wheel and tire assemblies 406 and the intermediate platform 409, and is not connected directly to the body 410.

The intermediate suspension system 403 connects the chassis 408 to the intermediate platform 409. The intermediate suspension system 403 includes linkages and/or passive suspension components, such as springs or passive dampers that, in combination, have a low or substantially zero net spring rate. The intermediate suspension system 403 is configured to constrain rotation of the intermediate platform 409 relative to the chassis 408 and to provide counterbalancing.

The body suspension system 404 connects the intermediate platform 409 to the body 410. The body suspension system 404 may include multiple active suspension actuators that cooperate to control low-frequency motion of the body 410 with respect to the intermediate platform 409 in multiple degrees of linear and/or rotational freedom. For example, the body suspension system 404 may be configured to control motion of the body 410 with respect to the intermediate platform 409 in three rotational degrees of freedom. The body suspension system 404 may act as a gimbal that does not constrain rotation and does not provide counterbalancing.

As one example, the passive suspension components may be arranged with respect to the body 410 and the intermediate platform 409 such that the line of action (e.g., the direction along which spring force is applied) for each of the passive suspension components of the body suspension system 404 passes through a center of gravity of the body 410. As one example, the body suspension system 404 may include three or more two-force links that are in compression and are oriented along a line of action that passes through the center of gravity of the body 410. As another example, the body suspension system 404 may include three or more two-force links that are in tension and are oriented along a line of action that passes through the center of gravity of the body 410.

The chassis 408 is connected to the wheel and tire assemblies 406 by the chassis suspension system 402 and is connected to the intermediate platform 409 by the intermediate suspension system 403. Otherwise, the chassis 408 is implemented according to the description of the chassis 108 of the vehicle 100.

The intermediate platform 409 is a structural member or assembly of structural members that are substantially rigid and serve as an intermediate structure between the chassis 408 and the body 410. The intermediate platform 409 may be a frame or other structure that is positioned between the chassis 408 and the body 410. The intermediate platform 409 is connected to the chassis 408 by the intermediate suspension system 403. The intermediate platform 409 is connected to the body 410 by the body suspension system 404.

Figure 5:
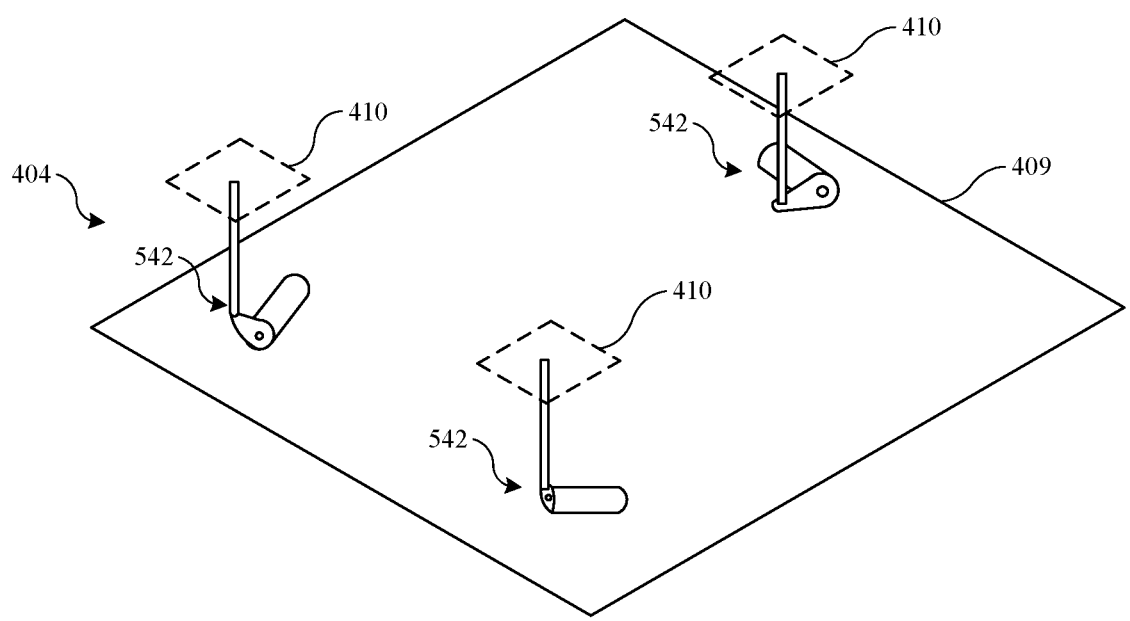
FIG. 5 is an illustration that shows an example of the body suspension system of FIG. 4.

FIG. 5 is an illustration that shows an example of the body suspension system 404. In the illustrated example, three actuator assemblies 542 are connected to the intermediate platform 409 and to the body 410 to control motion of the body 410 with respect to the intermediate platform 409, as previously described. For example, the three actuator assemblies 542 may be configured to control motion of the body 410 with respect to the intermediate platform 409 in three rotational degrees of freedom. The actuator assemblies 542 may include a rotary actuator that is fixed to the intermediate platform 409 and a connecting rod that is eccentrically connected to the rotary actuator by a pivoting joint or ball joint and connected to the body 410 by a pivoting joint or ball joint (e.g., as shown in FIG. 19).

In the suspension system 400 as previously described, the intermediate suspension system 403 as includes three actuators that control motion in three linear degrees of freedom (i.e., surge, sway, and heave) and the body suspension system 404 includes three actuators that control motion in three rotational degrees of freedom (i.e., roll, pitch, and yaw). In an alternative implementation, actuation of the linear and rotational degrees of freedom can be distributed differently between the intermediate suspension system 403 and the body suspension system 404. As an example, the intermediate suspension system 403 could include passive suspension components that control motion in two linear degrees of freedom and one rotational degree of freedom (e.g., surge, sway, and yaw actuators) and the body suspension system 404 could include active suspension actuators that control motion in one linear degree of freedom and two rotational degrees of freedom (e.g., heave, roll, and pitch actuators).

The body 410 is connected to the intermediate platform 409 by the body suspension system 404 and is not directly connected to the chassis 408. Otherwise, the chassis 408 is implemented according to the description of the chassis 108 of the vehicle 100.

Figure 6:
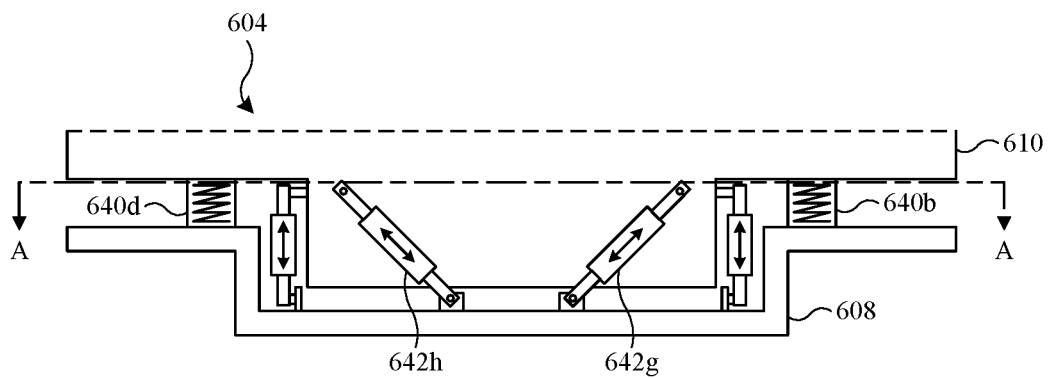
FIG. 6 is a side view illustration that shows a body suspension system according to a third implementation.
Figure 7:
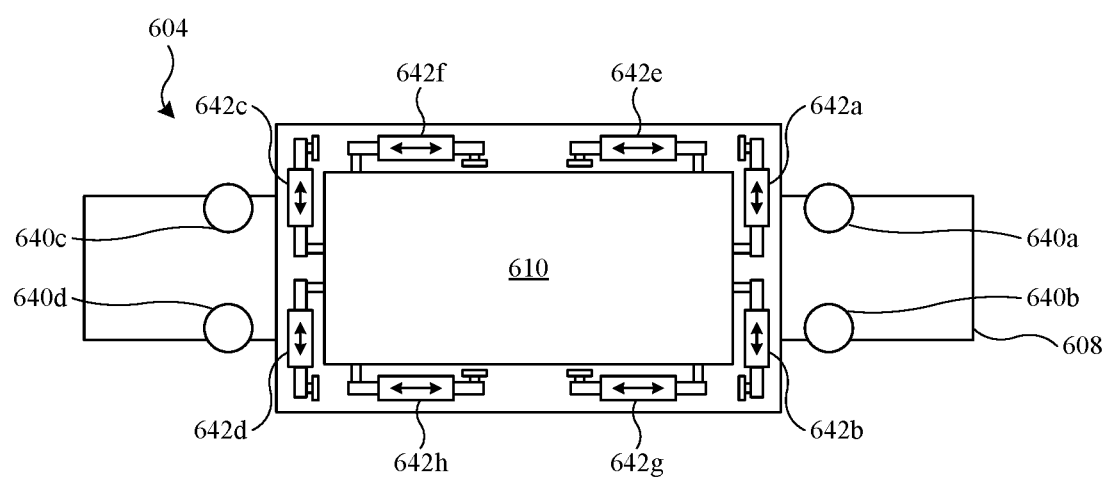
FIG. 7 is a top cross-section view taken along line A-A of FIG. 6 that shows the body suspension system according to the third implementation.

FIG. 6 is a side view illustration that shows a body suspension system 604 according to an example, and FIG. 7 is a top cross-section view taken along line A-A of FIG. 6 that shows the body suspension system 604. The body suspension system 604 can be implemented in the context of a vehicle, such as the vehicle 100, and the description of the vehicle 100 is incorporated here by reference. The body suspension system 604 is shown connecting a chassis 608, which is equivalent to the chassis 108 of the vehicle 100, to a body 610, which is equivalent to the body 110 of the vehicle 100.

The body suspension system 604 includes passive components that isolate the body 610 from the chassis 608, but which do not actively control motion of the body 610 with respect to the chassis 608. In the illustrated example, the body suspension system 604 includes four passive suspension components 640a-640d. As an example, the passive suspension components 640a-640d may be air springs or coil springs that have a low spring constant. The passive suspension components 640a-640d extend between the chassis 608 and the body 610. In the illustrated example, the passive suspension components 640a-640d include four suspension components (e.g., air springs or coil springs) that act in a substantially vertical direction and are arranged in a rectangular configuration (e.g., each of the passive suspension components 640a-640d is positioned at a corner of an imaginary rectangle).

The body suspension system 604 includes active components that control motion of the body 610 with respect to the chassis 608. The body suspension system 604 includes eight active suspension components, which in the illustrated example are linear actuators 642a-642h. The linear actuators 642a-642h each extend between a lower end that is pivotally connected to the chassis 608 and an upper end that is pivotally connected to the body 610. Each of the linear actuators 642a-642h is configured to expand and contract lengthwise to apply forces to the body 610.

In the illustrated example, a front pair of linear actuators 642a-642b are positioned toward the front end of the body 610 and are oriented such that they act both vertically and laterally (e.g., in a side-to-side direction relative to the body 610, transverse to a nominal direction of travel for the vehicle). A rear pair of linear actuators 642c-642d are positioned toward the rear end of the body 610 and are oriented such that they act both vertically and laterally. A left-side pair of linear actuators 642e-642f are positioned toward the left side of the body 610 and are oriented such that they act both vertically and longitudinally (e.g., in a front-to-back direction relative to the body 610, parallel to a nominal direction of travel for the vehicle). A right-side pair of linear actuators 642g-642h are positioned toward the right side of the body 610 and are oriented such that they act both vertically and longitudinally.

Figure 8:
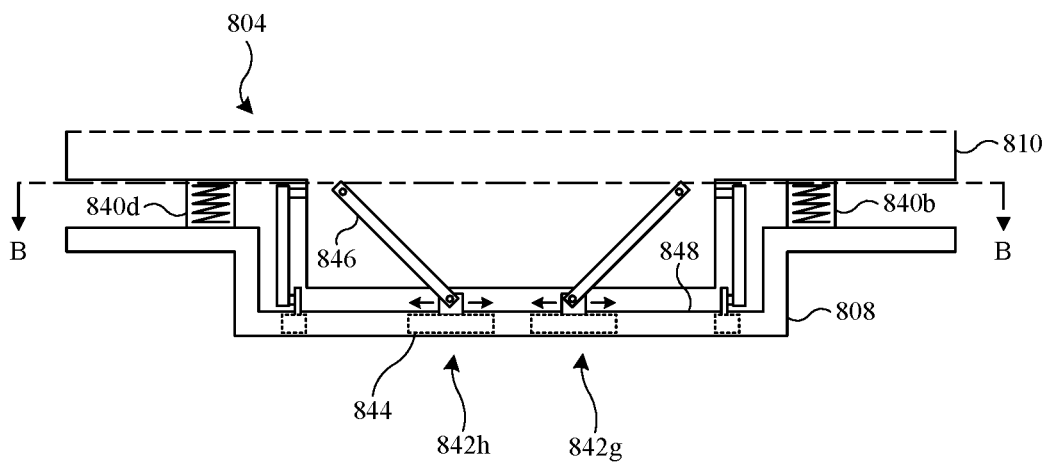
FIG. 8 is a side view illustration that shows a body suspension system according to a fourth implementation.
Figure 9:
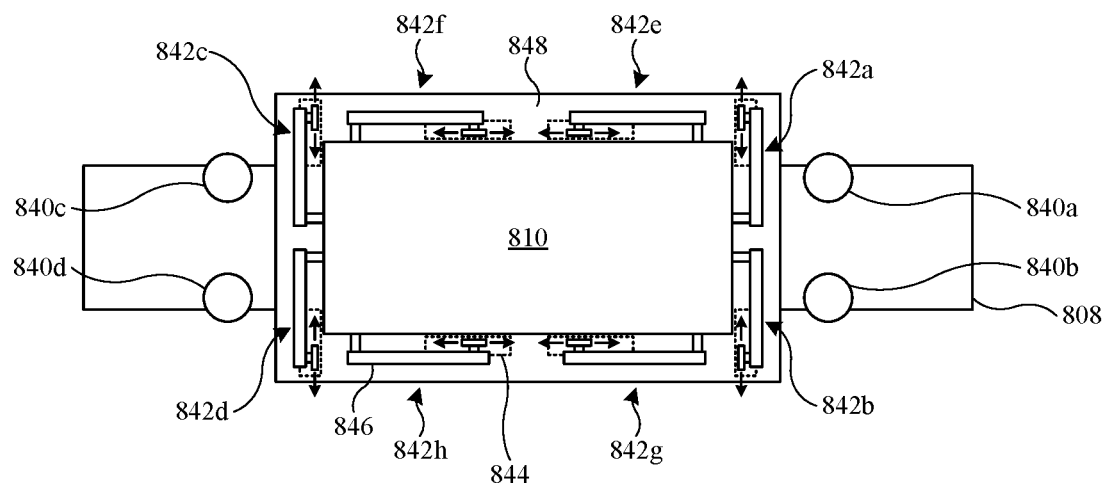
FIG. 9 is a top cross-section view taken along line B-B of FIG. 8 that shows the body suspension system according to the fourth implementation.

FIG. 8 is a side view illustration that shows a body suspension system 804 according to an example, and FIG. 9 is a top cross-section view taken along line B-B of FIG. 8 that shows the body suspension system 804. The body suspension system 804 can be implemented in the context of a vehicle, such as the vehicle 100, and the description of the vehicle 100 is incorporated here by reference. The body suspension system 804 is shown connecting a chassis 808, which is equivalent to the chassis 108 of the vehicle 100, to a body 810, which is equivalent to the body 110 of the vehicle 100.

The body suspension system 804 includes passive components that isolate the body 810 from the chassis 808, but which do not actively control motion of the body 810 with respect to the chassis 808. In the illustrated example, the body suspension system 804 includes four passive suspension components 840a-840d. As an example, the passive suspension components 840a-840d may be air springs or coil springs that have a low spring constant. The passive suspension components 840a-840d extend between the chassis 808 and the body 810. In the illustrated example, the passive suspension components 840a-840d include four suspension components (e.g., air springs or coil springs) that act in a substantially vertical direction and are arranged in a rectangular configuration (e.g., each of the passive suspension components 840a-840d is positioned at a corner of an imaginary rectangle).

The body suspension system 804 includes active components that control motion of the body 810 with respect to the chassis 808. The body suspension system 804 includes eight active suspension components, which in the illustrated example are actuator assemblies 842a-842h. The actuator assemblies 842a-842h each include an actuator 844 and a connecting rod 846. Each of the actuators 844 is connected to the chassis 808. The actuators 844 may be connected to the chassis 808 in a substantially horizontal orientation and such that the moving output structure of each actuator 844 acts along a line of action that is substantially horizontal. This configuration allows all or most of each of the actuators 844 to be located below an upper surface 848 of the chassis 808. For example, some or all of the actuators 844 may be connected to a frame member of the chassis 808 and/or located between the frame and battery box (not shown in FIGS. 8-9, see the chassis 108 of FIG. 1) of the chassis 808. The actuators 844 may be linear actuators that engender linear motion using, as examples, a rotary electric motor (e.g., as shown in FIG. 19), a linear electric motor, and/or a fluid-operated piston-cylinder actuator. In some implementations, counterbalance springs may be connected to the actuator assemblies 842a-842h, in which case the passive suspension components 840a-840d may be omitted.

The connecting rods 846 each extend between a lower end that is pivotally connected to a respective one of the actuators 844 and an upper end that is pivotally connected to the body 810. The lower end of each of the connecting rods 846 is connected to the moving output structure of the respective one of the actuators 844, either directly or by a structure such as a bracket. Each of the actuators 844 is configured apply forces to the respective one of the connecting rods 846, so that the applied forces are transmitted to the body 810.

In the illustrated example, a front pair of actuator assemblies 842a-842b are positioned toward the front end of the body 810 and are oriented such that the respective ones of the connecting rods 846 act both vertically and laterally (e.g., in a side-to-side direction relative to the body 810, transverse to a nominal direction of travel for the vehicle) in response to lateral movement of the lower ends of the connecting rods 846 by respective ones of the actuators 844. A rear pair of linear actuators actuator assemblies 842c-842d are positioned toward the rear end of the body 810 and are oriented such that the respective ones of the connecting rods 846 act both vertically and laterally in response to lateral movement of the lower ends of the connecting rods 846 by respective ones of the actuators 844. A left-side pair of linear actuators actuator assemblies 842e-842f are positioned toward the left side of the body 810 and are oriented such that the respective ones of the connecting rods 846 act both vertically and longitudinally (e.g., in a front-to-back direction relative to the body 810, parallel to a nominal direction of travel for the vehicle) in response to longitudinal movement of the lower ends of the connecting rods 846 by respective ones of the actuators 844. A right-side pair of linear actuators actuator assemblies 842g-842h are positioned toward the right side of the body 810 and are oriented such that the respective ones of the connecting rods 846 act both vertically and longitudinally in response to longitudinal movement of the lower ends of the connecting rods 846 by respective ones of the actuators 844.

Figure 10:
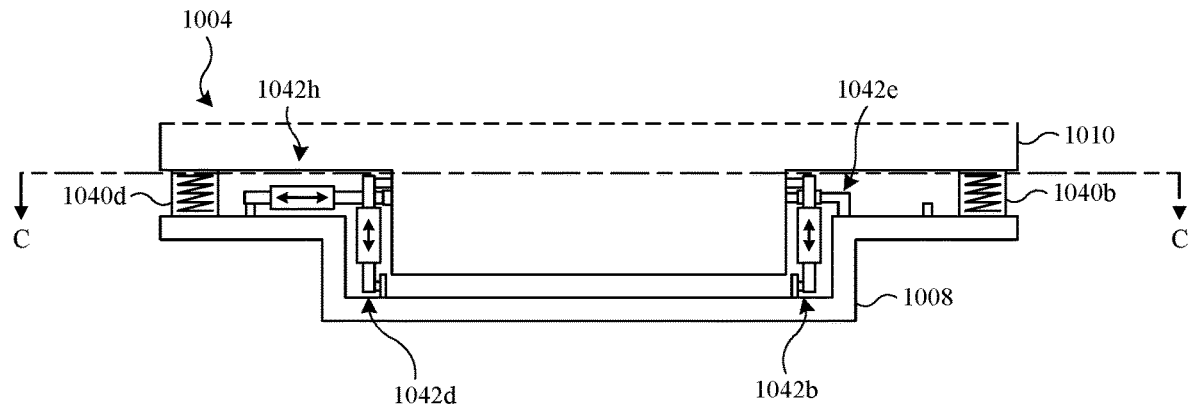
FIG. 10 is a side view illustration that shows a body suspension system according to a fifth implementation.
Figure 11:
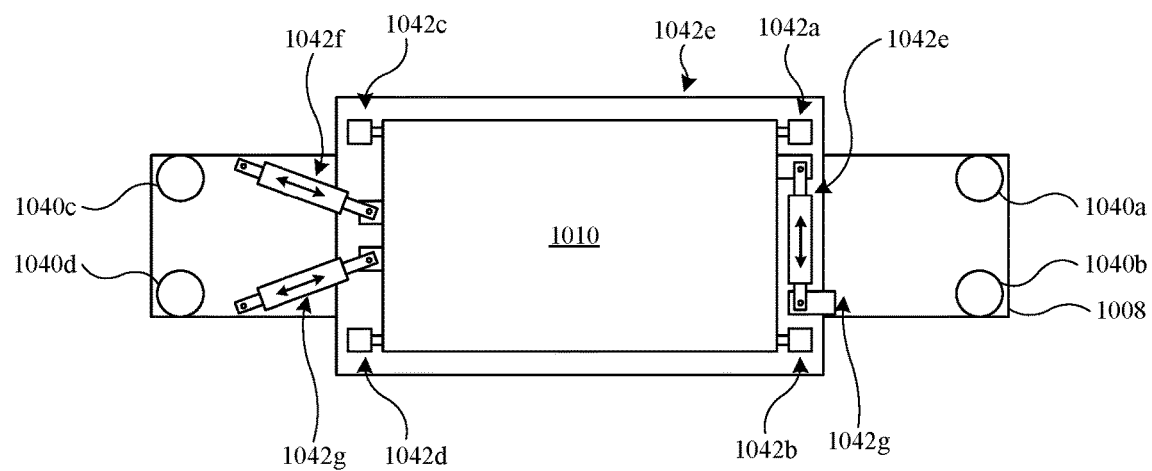
FIG. 11 is a top cross-section view taken along line C-C of FIG. 10 that shows the body suspension system according to the fifth implementation.

FIG. 10 is a side view illustration that shows a body suspension system 1004 according to an example, and FIG. 11 is a top cross-section view taken along line C-C of FIG. 10 that shows the body suspension system 1004. The body suspension system 1004 can be implemented in the context of a vehicle, such as the vehicle 100, and the description of the vehicle 100 is incorporated here by reference. The body suspension system 1004 is shown connecting a chassis 1008, which is equivalent to the chassis 108 of the vehicle 100, to a body 1010, which is equivalent to the body 110 of the vehicle 100.

The body suspension system 1004 includes passive components that isolate the body 1010 from the chassis 1008, but which do not actively control motion of the body 1010 with respect to the chassis 1008. In the illustrated example, the body suspension system 1004 includes four passive suspension components 1040a-1040d. As an example, the passive suspension components 1040a-1040d may be air springs or coil springs that have a low spring constant. The passive suspension components 1040a-1040d extend between the chassis 1008 and the body 1010. In the illustrated example, the passive suspension components 1040a-1040d include four suspension components (e.g., air springs or coil springs) that act in a substantially vertical direction and are arranged in a rectangular configuration (e.g., each of the passive suspension components 1040a-1040d is positioned at a corner of an imaginary rectangle).

The body suspension system 1004 includes active components that control motion of the body 1010 with respect to the chassis 1008. The body suspension system 1004 includes seven active suspension components, which in the illustrated example are linear actuators 1042a-1042g. The linear actuators 1042a-1042g are linear actuators that are connected to the chassis 1008 and the body 1010 (e.g., by pivot joints or ball joints) and are operable to apply forces between the chassis 1008 and the body 1010 by extension and retraction to control motion of the body 1010 with respect to the chassis 1008.

In the illustrated example, a front vertical pair of linear actuators 1042a-1042b are positioned toward the front end of the body 1010 at left and right sides of the body 1010 and are oriented to act substantially vertically. A rear vertical pair of linear actuators 1042c-1042d are positioned toward the rear end of the body 1010 at left and right sides of the body 1010 and are oriented to act vertically. A front lateral actuator 1042e is connected to the chassis 1008 and to the front end of the body 1010 in a substantially lateral orientation so that the front lateral actuator 1042e acts in a substantially lateral direction. A rear pair of linear actuators 1042f-1042g are positioned toward the rear of the body 1010 and are oriented substantially horizontally and diagonally relative to the lateral and longitudinal directions of the vehicle (e.g., diagonally inward as they extend toward the body 1010 in the illustrated example) so that forces applied between the chassis 1008 and the body 1010 act laterally and longitudinally.

Figure 12:
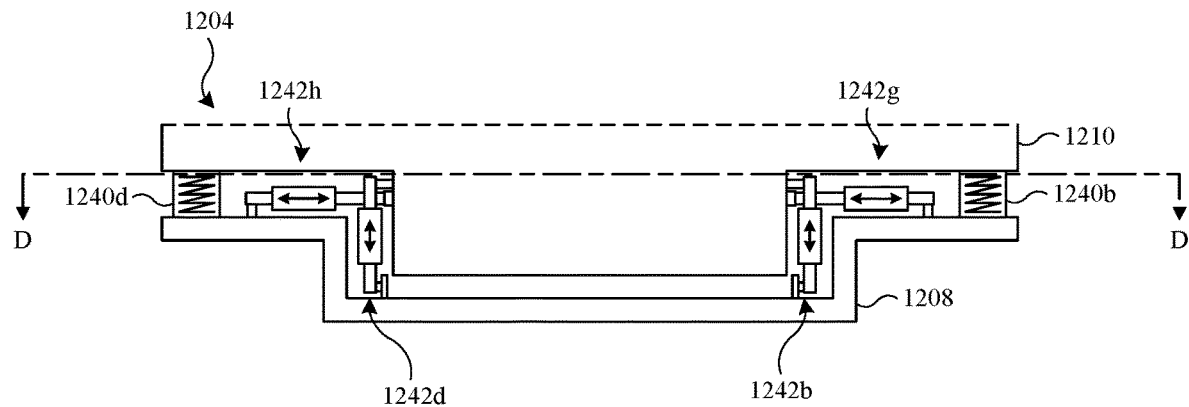
FIG. 12 is a side view illustration that shows a body suspension system according to a sixth implementation.
Figure 13:
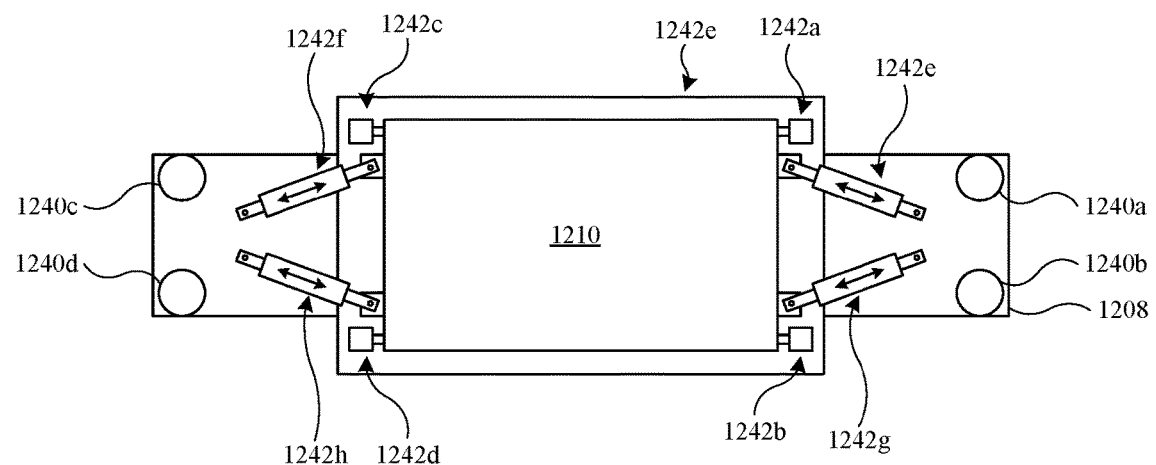
FIG. 13 is a top cross-section view taken along line D-D of FIG. 12 that shows the body suspension system according to the sixth implementation.

FIG. 12 is a side view illustration that shows a body suspension system 1204 according to an example, and FIG. 13 is a top cross-section view taken along line D-D of FIG. 12 that shows the body suspension system 1204. The body suspension system 1204 can be implemented in the context of a vehicle, such as the vehicle 100, and the description of the vehicle 100 is incorporated here by reference. The body suspension system 1204 is shown connecting a chassis 1208, which is equivalent to the chassis 108 of the vehicle 100, to a body 1210, which is equivalent to the body 110 of the vehicle 100.

The body suspension system 1204 includes passive components that isolate the body 1210 from the chassis 1208, but which do not actively control motion of the body 1210 with respect to the chassis 1208. In the illustrated example, the body suspension system 1204 includes four passive suspension components 1240a-1240d. As an example, the passive suspension components 1240*a*-1240*d* may be air springs or coil springs that have a low spring constant. The passive suspension components 1240*a*-1240*d* extend between the chassis 1208 and the body 1210. In the illustrated example, the passive suspension components 1240*a*-1240*d* include four dampers that act in a substantially vertical direction and are arranged in a rectangular configuration (e.g., each of the passive suspension components 1240*a*-1240*d* is positioned at a corner of an imaginary rectangle).

The body suspension system 1204 includes active components that control motion of the body 1210 with respect to the chassis 1208. The body suspension system 1204 includes eight active suspension components, which in the illustrated example are linear actuators 1242*a*-1242*h*. The linear actuators 1242*a*-1242*h* are linear actuators that are connected to the chassis 1208 and the body 1210 (e.g., by pivot joints or ball joints) and are operable to apply forces between the chassis 1208 and the body 1210 by extension and retraction to control motion of the body 1210 with respect to the chassis 1208.

In the illustrated example, a front vertical pair of linear actuators 1242*a*-1242*b* are positioned toward the front end of the body 1210 at left and right sides of the body 1210 and are oriented to act substantially vertically. A rear vertical pair of linear actuators 1242*c*-1242*d* are positioned toward the rear end of the body 1210 at left and right sides of the body 1210 and are oriented to act vertically. A front pair of linear actuators 1242*e*-1242*f* are positioned toward the front end of the body 1010 and are oriented substantially horizontally and diagonally relative to the lateral and longitudinal directions of the vehicle (e.g., diagonally outward as they extend toward the body 1210 in the illustrated example) so that forces applied between the chassis 1208 and the body 1210 act laterally and longitudinally. A rear pair of linear actuators 1242*g*-1242*h* are positioned toward the rear of the body 1210 and are oriented substantially horizontally and diagonally relative to the lateral and longitudinal directions of the vehicle (e.g., diagonally outward as they extend toward the body 1210 in the illustrated example) so that forces applied between the chassis 1208 and the body 1210 act laterally and longitudinally.

Figure 14:
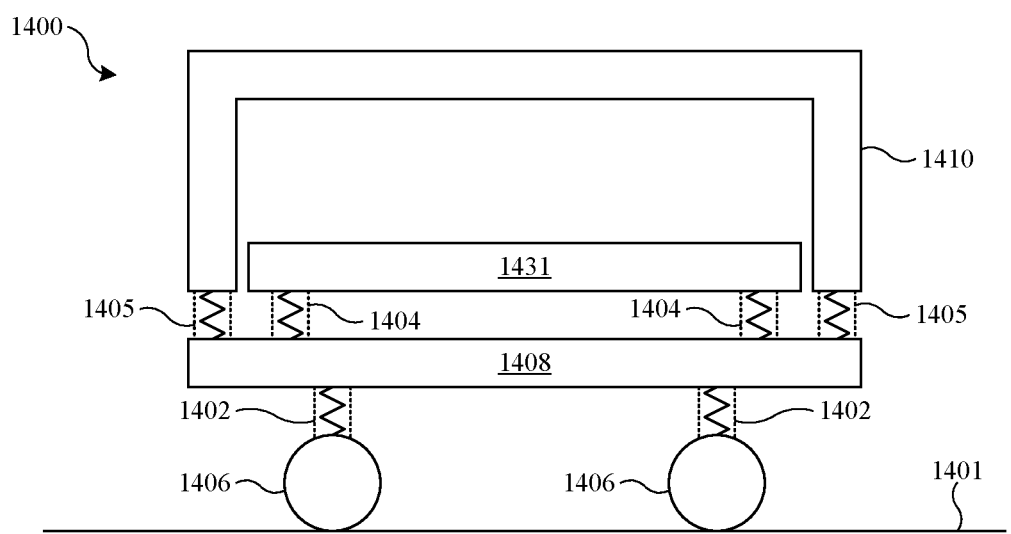
FIG. 14 is a side view illustration that shows a vehicle that includes a chassis suspension system, passive body mounts, and a passenger compartment suspension system.

FIG. 14 is a side view illustration that shows a vehicle 1400 that includes a chassis suspension system 1402, passive body mounts 1405, and a passenger compartment suspension system 1404. The vehicle 1400 also includes wheel and tire assemblies 1406, a chassis 1408, a body 1410, and a passenger compartment structure 1431. The description of the vehicle 100 is generally applicable to the vehicle 1400 of FIG. 14 except as described herein.

The chassis suspension system 1402 suspends the sprung mass of the vehicle 1400 relative to the unsprung mass of the vehicle 1400. The configuration of the chassis suspension system 1402 is the same as the configuration of the chassis suspension system 102 of the vehicle 100 as previously described.

The body 1410 of the vehicle 1400 is equivalent to the body 110 of the vehicle 100, except that it is connected to the chassis 1408 by the passive body mounts 1405 as opposed to by active suspension components, and is further distinguished from the body 110 in that the passenger compartment structure 1431 is movable with respect to the body 1410. The passive body mounts 1405 may include purely passive suspension components. The passive body mounts 1405 may exclude active components that are able to apply forces between the wheel and tire assemblies 106 and the chassis 108. In an alternative implementation, the passive body mounts 1405 may include very low frequency active components, such as air springs, that are configured to adjust the height of the body 1410 with respect to the chassis 1408, and which are not actively controlled to dampen vibrations.

The passenger compartment suspension system 1404 suspends the passenger compartment structure 1431 relative to the chassis 1408. The sprung mass of the vehicle 1400 therefore includes two portions, a first portion including the chassis 1408 and components connected to it, and a second portion including the passenger compartment structure 1431 and components connected to it, with the two portions of the sprung mass being connected to each other by the passenger compartment suspension system 1404. As will be explained further herein, the passenger compartment suspension system 1404 is configured to move the passenger compartment structure 1431 with respect to the chassis 1408 by applying forces between the passenger compartment structure 1431 and the chassis 1408 in response to control signals that are determined based on motion of the vehicle 1400 and the chassis 1408. As an example, the passenger compartment suspension system 1404 may be configured to control motion of the passenger compartment structure 1431 relative to the chassis 1408 in three linear degrees of freedom and three rotational degrees of freedom.

The passenger compartment suspension system 1404 includes components that are connected to the chassis 1408 and to the passenger compartment structure 1431. The components that are included in the chassis suspension system 1402 define isolated load paths between the chassis 1408 and the passenger compartment structure 1431. The passenger compartment structure 1431 is not directly connected to the wheel and tire assemblies 1406 and instead is connected indirectly through the chassis 1408.

The passenger compartment suspension system 1404 is connected to the passenger compartment structure 1431 such that all portions of the passenger compartment structure 1431 and components located in it are affected equally by motion of the passenger compartment structure 1431 relative to the chassis 1408 that is caused by the passenger compartment suspension system 1404. For example, active suspension forces may be applied to control motion of the passenger compartment structure 1431 relative to the chassis 1408 (e.g., to cancel low-frequency motion of the passenger compartment structure 1431 relative to the chassis 1408). In addition, because the body 1410 is connected to the chassis 1408 by the passive body mounts 1405, the connection of the passenger compartment structure 1431 to the chassis 1408 by the passenger compartment suspension system causes the passenger compartment structure 1431 to move with respect to both the chassis 1408 and the body 1410.

The passenger compartment suspension system 1404 may include active suspension components. The active suspension components of the passenger compartment suspension system 1404 may include six or more active suspension actuators that are connected to the passenger compartment structure 1431 and the chassis 1408. Inclusion of six or more active suspension actuators in the passenger compartment suspension system 1404 allows the passenger compartment suspension system 1404 to be configured to control motion of the passenger compartment structure 1431 with respect to the chassis 1408 in three linear degrees of freedom and in three rotational degrees of freedom. As one example, the active suspension components of the passenger compartment suspension system 1404 may include linear actuators that are connected to the passenger compartment structure 1431 and the chassis 1408. As another example, the active suspension components of the passenger compartment suspension system 1404 may include a ball screw actuator that advances and retracts an output shaft along a line of action by rotation of an electric motor. As another example, the active suspension components of the passenger compartment suspension system 1404 may include a linear electric actuator that advances and retracts an output shaft along a line of action using a linear electric motor. As another example, the active suspension components of the passenger compartment suspension system 1404 may include a rotary actuator and link (e.g., as shown in FIG. 19) as an option, either with or without speed reduction. The link may be connected eccentrically with respect to the rotation axis of the rotary actuator. Speed reduction may be implemented using a planetary gear, offset gears, a harmonic drive, a belt drive, an epicyclic drive, etc.

The wheel and tire assemblies 1406 include unsprung components of the vehicle 1400 that support the vehicle 1400 with respect to a surface 1401, such as a road surface. The wheel and tire assemblies 1406 may include wheels, tires (e.g., pneumatic tires), wheel hubs, braking components, steering components (e.g., steering linkages and/or hub mounted steering components), suspension linkages, propulsion linkages (e.g., in implementations that include chassis-mounted propulsion motors), and/or propulsion motors (e.g., in implementations that include hub motors).

The chassis 1408 is the primary structure of the vehicle 1400 that supports all other vehicle components and is directly supported by the wheel and tire assemblies 1406. The chassis 1408 may include a frame and vehicle components that are supported by the frame. Examples of the vehicle components that are supported by the frame include an energy source (e.g., a fuel tank or batter pack), propulsion system components (e.g., an internal combustion engine and/or electric motors), charging system components, thermal system components (e.g., for propulsion system cooling and passenger compartment heating and cooling), and vehicle control systems, which may include computing systems that provide automated vehicle control functions.

The chassis 1408 may be equivalent to the chassis 108 of the vehicle 100. The description of the chassis 108, e.g., including the description made in connection with FIG. 2, is hereby incorporated by reference in the description of the vehicle 100. The implementation of the chassis 1408 differs from the implementation shown in FIG. 2 in that the body suspension mounts 222 instead function as passenger compartment suspension mounts that are connected to the passenger compartment suspension system 1404, and in that the passive body mounts 1405 are also connected to the chassis 1408 by separate mounting structures.

Figure 15:
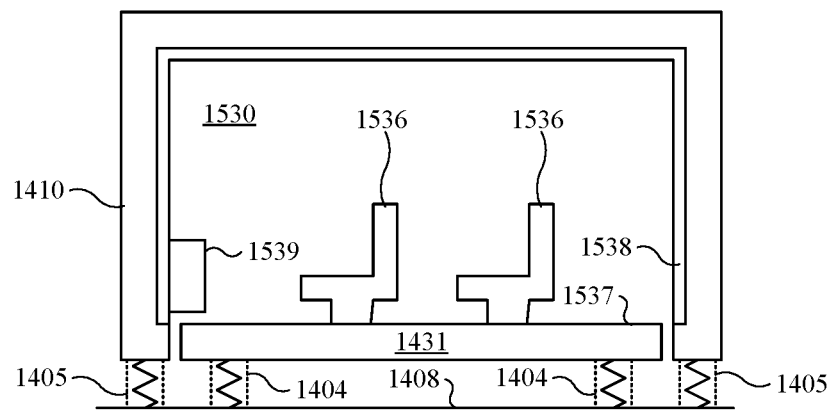
FIG. 15 is a side view illustration that shows a first example of a body and a passenger compartment structure.

FIG. 15 is an illustration that shows a first example of the body 1410 and the passenger compartment structure 1431. The body 1410 is generally as described with respect to the body 110, including structural portions, aesthetic portions, windows, doors, and/or other features. The body 1410 and the passenger compartment structure 1431 cooperated to define a passenger compartment 1530 of the vehicle 1400.

The passenger compartment 1530 is an internal space within the body 1410 that is the part of the vehicle 1400 that is configured to carry passengers and cargo, and the body 1410 may define doors and windows that are accessible from the passenger compartment 1530. In some implementations, the passenger compartment 1530 is omitted, for example, in favor of a dedicated cargo compartment, in which case the suspension systems described herein may be applied, for example, in vehicles that carry vibration-sensitive cargo.

In the illustrated implementation, the passenger compartment structure 1431 includes a floor surface 1537 of the passenger compartment 1530 and seats 1536 (e.g., at least two seats) that are located inside the passenger compartment and are supported by the floor surface 1537. Thus, the seats 1536 move with the passenger compartment structure 1431 according to the active suspension control applied to the passenger compartment structure 1431 by the passenger compartment suspension system 1404. Other portions of the passenger compartment 1530 are connected to and supported by the body 1410 of the vehicle 1400, such as passenger compartment wall panels 1538 and an instrument panel 1539, and therefore do not move in unison with the passenger compartment structure 1431 and the floor surface 1537 of the passenger compartment 1530.

Figure 16:
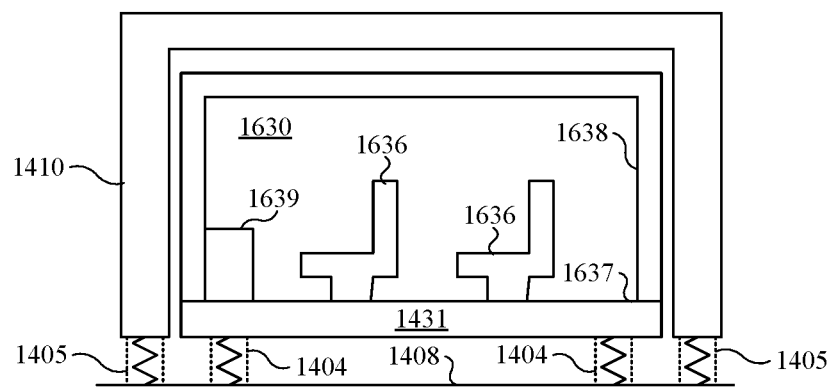
FIG. 16 is a side view illustration that shows a second example of a body and a passenger compartment structure.

FIG. 16 is an illustration that shows a second example of the body 1410 and the passenger compartment structure 1431. The body 1410 is generally as described with respect to the body 110 of the vehicle 100, including structural portions, aesthetic portions, windows, doors, and/or other features. The body 1410 and the passenger compartment structure 1431 cooperated to define a passenger compartment 1630 of the vehicle 1400.

The passenger compartment 1630 is an internal space within the body 1410 that is the part of the vehicle 1400 that is configured to carry passengers and cargo, and the body 1410 may define doors and windows that are accessible from the passenger compartment 1630. In some implementations, the passenger compartment 1630 is omitted, for example, in favor of a dedicated cargo compartment, in which case the suspension systems described herein may be applied, for example, in vehicles that carry vibration-sensitive cargo.

In the illustrated implementation, the passenger compartment structure 1431 includes a floor surface 1637 of the passenger compartment 1630, and at least two of the seats 1636 that are located inside the passenger compartment are supported by the floor surface 1637. The passenger compartment structure 1431 also includes other portions of the passenger compartment 1630, such as wall panels 1638 of the passenger compartment 1630 and an instrument panel 1639 of the passenger compartment 1630. Thus, the seats 1636, the floor surface 1637, the wall panels 1638 and the instrument panel 1639 may be part of the passenger compartment structure 1431 and therefore connected to and supported by the passenger compartment suspension system 1404 to move with respect to the body 1410 according to the active suspension control applied to the passenger compartment structure 1431 by the passenger compartment suspension system 1404. Additional portions of the passenger compartment 1630 (e.g., ceiling panels, pillar covers, etc.) may either be part of the passenger compartment structure 1431 to move in unison with the passenger compartment structure 1431 or may be connected to and supported by the body 1410 of the vehicle 1400, and therefore do not move in unison with the passenger compartment structure 1431. In some implementations, all of the interior structures of the passenger compartment 1630 may be supported by and move in unison with the passenger compartment structure 1431 and the passenger compartment suspension system 1404.

It will be appreciated that multiple implementations and variations of the vehicle 1400 are possible. For example, the vehicle 1400 may include the wheel and tire assemblies 1406, the chassis 1408, the body 1410, the chassis suspension system 1402, and the passenger compartment suspension system 1404. In a first implementation, the chassis suspension system 1402 is a purely passive suspension system that includes no active components that are able to apply forces between the wheel and tire assemblies 1406 and the chassis 1408, and the passenger compartment suspension system 1404 includes passive components to support the body 1410 relative to the chassis 1408 as well as active suspension components that control motion of the body 1410 relative to the chassis 1408. In a second implementation, both the chassis suspension system 1402 and the passenger compartment suspension system 1404 include passive suspension components and active suspension components. In a third implementation, the chassis suspension system 1402 includes passive suspension components and active suspension components while the passenger compartment suspension system 1404 includes only passive suspension system components.

It will be further appreciated that the vehicle 1400 may incorporate features described with respect to other implementations, such as the implementations described with respect to FIGS. 6-13.

Figure 17:
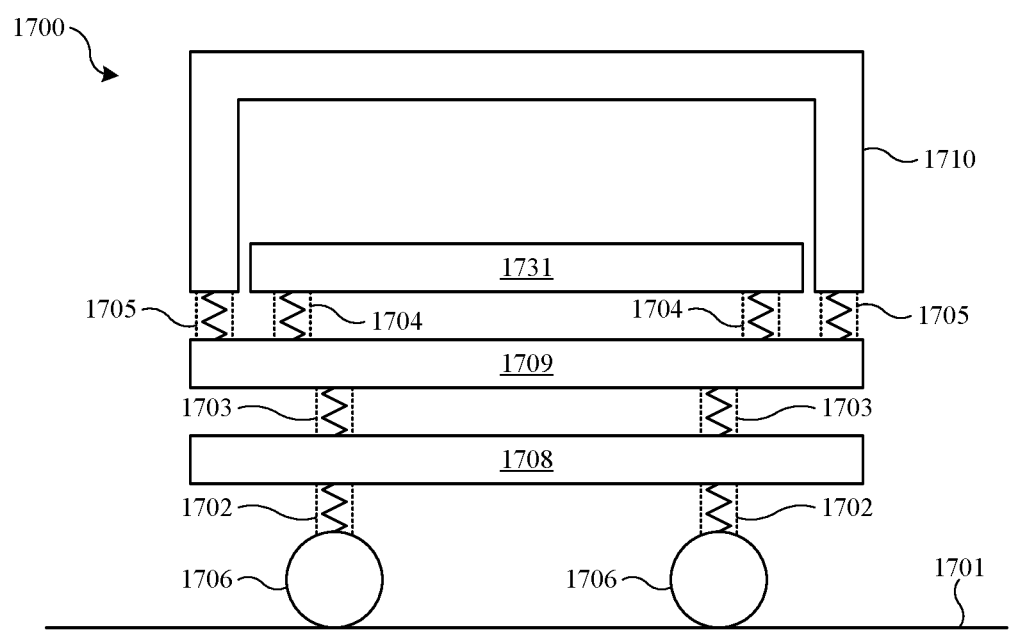
FIG. 17 is a side view illustration that shows a vehicle that includes a chassis suspension system, an intermediate suspension system, passive body mounts, and a passenger compartment suspension system.

FIG. 17 is a side view illustration that shows a vehicle 1700 that includes a chassis suspension system 1702, an intermediate suspension system 1703, passive body mounts 1705, and a passenger compartment suspension system 1704. The vehicle 1700 also includes wheel and tire assemblies 1706, a chassis 1708, an intermediate platform 1709, a body 1710, and a passenger compartment structure 1731. The descriptions of the vehicle 400 and the vehicle 1400 are generally applicable to the vehicle 1700 of FIG. 17 except as described herein.

The chassis suspension system 1702 suspends the sprung mass of the vehicle 1700 relative to the unsprung mass of the vehicle 1700. The configuration of the chassis suspension system 1702 is the same as the configuration of the chassis suspension system 402 of the vehicle 400 as previously described. It is connected to the wheel and tire assemblies 1706 and the chassis 1708, and is not connected directly to the body 1710 or the passenger compartment structure 1731.

The intermediate suspension system 1703 connects the chassis 1708 to the intermediate platform 1709. The intermediate suspension system 1703 includes linkages and/or passive suspension components, such as springs or passive dampers that, in combination, have a low or substantially zero net spring rate. The intermediate suspension system 1703 is configured to constrain rotation of the intermediate platform 409 relative to the chassis 408 and to provide counterbalancing.

Connection of the body 1710 and the passenger compartment structure 1731 by the passive body mounts 1705 and the passenger compartment suspension system 1704 is implemented in the same manner as described with respect to connection of the body 1410 and the passenger compartment structure 1431 by the passive body mounts 1405 and the passenger compartment suspension system 1404 of the vehicle 1400. A passenger compartment may also be implemented in the vehicle 1700 by connection of part of or all of the passenger compartment to the passenger compartment structure 1731 in the manner described with respect to the passenger compartment 1530 of FIG. 15 and the passenger compartment 1630 of FIG. 16.

The body 1710 of the vehicle 1700 is equivalent to the body 410 of the vehicle 400, except that it is connected to the chassis 1708 by the passive body mounts 1705 as opposed to by active suspension components, and is further distinguished from the body 110 in that the passenger compartment structure 1731 is movable with respect to the body 1710. The passive body mounts 1705 may include purely passive suspension components. The passive body mounts 1705 may exclude active components that are able to apply forces between the wheel and tire assemblies 406 and the chassis 408. In an alternative implementation, the passive body mounts 1705 may include very low frequency active components, such as air springs, that are configured to adjust the height of the body 1710 with respect to the chassis 1708, and which are not actively controlled to dampen vibrations.

The passenger compartment suspension system 1704 suspends the passenger compartment structure 1731 relative to the intermediate platform 1709. The passenger compartment suspension system 1704 is configured to move the passenger compartment structure 1731 with respect to the intermediate platform 1709 by applying forces between the passenger compartment structure 1731 and the intermediate platform 1709 in response to control signals that are determined based on motion of the vehicle 1700 and the intermediate platform 1709. As an example, the passenger compartment suspension system 1704 may be configured to control motion of the passenger compartment structure 1731 relative to the intermediate platform 1709 in three linear degrees of freedom and three rotational degrees of freedom.

The passenger compartment suspension system 1704 includes components that are connected to the intermediate platform 1709 and to the passenger compartment structure 1731. The components that are included in the chassis suspension system 1702 define isolated load paths between the intermediate platform 1709 and the passenger compartment structure 1731. The passenger compartment structure 1731 is not directly connected to the wheel and tire assemblies 1706 and instead is connected indirectly through the intermediate platform 1709 and the chassis 1708.

The passenger compartment suspension system 1704 is connected to the passenger compartment structure 1731 such that all portions of the passenger compartment structure 1731 and components located in it are affected equally by motion of the passenger compartment structure 1731 relative to the intermediate platform 1709 that is caused by the passenger compartment suspension system 1704. For example, active suspension forces may be applied to control motion of the passenger compartment structure 1731 relative to the intermediate platform 1709 (e.g., to cancel low-frequency motion of the passenger compartment structure 1731 relative to the intermediate platform 1709). In addition, because the body 1710 is connected to the intermediate platform 1709 by the passive body mounts 1705, the connection of the passenger compartment structure 1731 to the intermediate platform 1709 by the passenger compartment suspension system causes the passenger compartment structure 1731 to move with respect to both the intermediate platform 1709 and the body 1710.

The passenger compartment suspension system 1704 may include active suspension components. The active suspension components of the passenger compartment suspension system 1704 may include six or more active suspension actuators that are connected to the passenger compartment structure 1731 and the intermediate platform 1709. Inclusion of six or more active suspension actuators in the passenger compartment suspension system 1704 allows the passenger compartment suspension system 1704 to be configured to control motion of the passenger compartment structure 1731 with respect to the intermediate platform 1709 in three linear degrees of freedom and in three rotational degrees of freedom. As one example, the active suspension components of the passenger compartment suspension system 1704 may include linear actuators that are connected to the passenger compartment structure 1731 and the intermediate platform 1709. As another example, the active suspension components of the passenger compartment suspension system 1704 may include a ball screw actuator that advances and retracts an output shaft along a line of action by rotation of an electric motor. As another example, the active suspension components of the passenger compartment suspension system 1704 may include a linear electric actuator that advances and retracts an output shaft along a line of action using a linear electric motor. As another example, the active suspension components of the passenger compartment suspension system 1704 may include a rotary actuator and link (e.g., as shown in FIG. 19) as an option, either with or without speed reduction. The link may be connected eccentrically with respect to the rotation axis of the rotary actuator. Speed reduction may be implemented using a planetary gear, offset gears, a harmonic drive, a belt drive, an epicyclic drive, etc.

The wheel and tire assemblies 1706 include unsprung components of the vehicle 1700 that support the vehicle 1700 with respect to a surface 1701, such as a road surface. The wheel and tire assemblies 1706 may include wheels, tires (e.g., pneumatic tires), wheel hubs, braking components, steering components (e.g., steering linkages and/or hub mounted steering components), suspension linkages, propulsion linkages (e.g., in implementations that include chassis-mounted propulsion motors), and/or propulsion motors (e.g., in implementations that include hub motors).

The chassis 1708 is the primary structure of the vehicle 1700 that supports all other vehicle components and is directly supported by the wheel and tire assemblies 1706. The chassis 1708 may include a frame and vehicle components that are supported by the frame. Examples of the vehicle components that are supported by the frame include an energy source (e.g., a fuel tank or batter pack), propulsion system components (e.g., an internal combustion engine and/or electric motors), charging system components, thermal system components (e.g., for propulsion system cooling and passenger compartment heating and cooling), and vehicle control systems, which may include computing systems that provide automated vehicle control functions.

The chassis 1708 may be equivalent to the chassis 108 of the vehicle 100. The description of the chassis 108, e.g., including the description made in connection with FIG. 2, is hereby incorporated by reference in the description of the vehicle 100. The implementation of the chassis 1708 differs from the implementation shown in FIG. 2 in that the body suspension mounts 222 instead function as passenger compartment suspension mounts that are connected to the passenger compartment suspension system 1704, and in that the passive body mounts 1705 are also connected to the chassis 1708 by separate mounting structures.

It will be appreciated that multiple implementations and variations of the vehicle 1700 are possible, including differing arrangements of active and/or passive suspension components in the chassis suspension system 1702, the intermediate suspension system 1703, and the passenger compartment suspension system 1704, as similarly described with respect to the vehicle 1400. It will be further appreciated that the vehicle 1400 may incorporate features described with respect to other implementations, such as the implementations described with respect to FIGS. 6-13.

Figure 18:
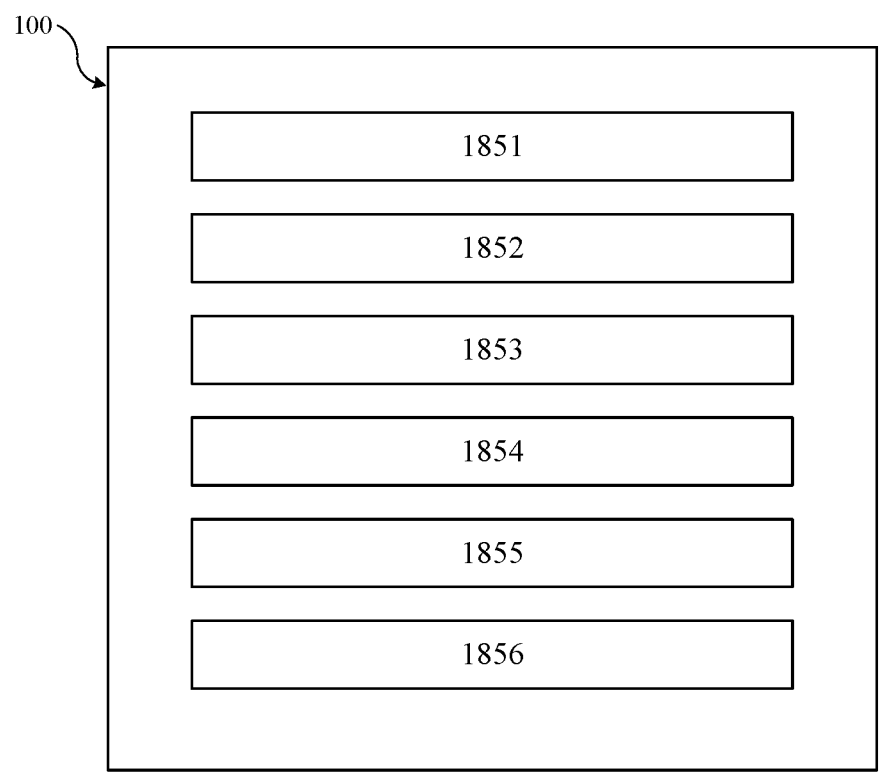
FIG. 18 is a block diagram that shows examples of components that can be included in the vehicle.

FIG. 18 is a block diagram that shows examples of components that can be included in the vehicle 100 in addition to those components previously described. These components may also be included in other vehicles that are described herein, such as the vehicle 400, the vehicle 1400, and the vehicle 1700.

The vehicle 100 may include a propulsion system 1851, a steering system 1852, a braking system 1853, a suspension system 1854 (e.g., including the chassis suspension system 102 and the body suspension system 104), a sensor system 1855, and a controller 1856. The propulsion system 1851, the steering system 1852, the braking system 1853, and the suspension system 1854 are all controllable actuator systems that can be controlled by commands that are output by the controller 1856. The controller 1856 determines commands (e.g., to implement driver assistance functions or automated driving functions) to be output to the propulsion system 1851, the steering system 1852, the braking system 1853, and the suspension system 1854 using signals received from the sensor system 1855.

The controller 1856 may be a conventional computing device (e.g., having components such as a processor and a memory) that is provided with computer program instructions that allow the controller 1856 to generate commands that regulate operation of the active components of the suspension system 1854 using sensor signals that are generated by the sensor system 1855 and are provided to the controller 1856 as inputs. The sensors of the sensors system 1855 may include, as examples, one or more sensors (e.g., inertial measurement units) that measure motion of the vehicle (e.g., a first sensor to measure motion of the body 110, a second sensor to measure motion of the chassis, and sensors to measure motion of the wheel and tire assemblies 106, etc.), one or more cameras that monitor conditions around the vehicle 100, and/or one or more three-dimensional sensors (e.g., LIDAR, structured light, etc.) that monitor conditions around the vehicle 100. As an example, the computer program instructions of the controller 1856 may monitor relative accelerations, determine forces to be applied by the active components of the suspension system 1854, and output a command to the active components of the suspension system 1854 that causes the active components to apply the determined forces.

As an example, the sensor system 1855 may include sensors that output motion signals that describe motion of the body 110 of the vehicle 100 and motion of the chassis 108 of the vehicle 100. Using the motion signals from the sensor system 1855, the controller 1856 determines control signals for the active suspension actuators that are included in the body suspension system 104. As an example, signals that describe forces and accelerations that are currently being experienced by parts of the vehicle 100 can be used as a basis for determining the control signals for the active suspension actuators. In addition, forward-looking sensor systems (e.g., LIDAR, imaging systems, etc.) may be used to sense the conditions of the roadway ahead of the vehicle 100 and can be used as a basis for determining the control signals for the active suspension actuators. The controller 1856 transmits the control signals to the active suspension actuators that are included in the body suspension system 104, which causes the body suspension system 104 to control motion of the body 110 of the vehicle 100 with respect to the chassis 108 of the vehicle 100 using the control signals.

FIG. 19 is an illustration that shows an active suspension actuator assembly 1960 that can be used to implement the actuators described herein. The active suspension actuator assembly 1960 is configured to apply forces between two components using a rotary electric motor and an eccentric drive. In the illustrated example, the active suspension actuator assembly 1960 includes an electric motor 1961, an encoder 1962, a gear box 1963 to apply gear reduction to the rotational output of the electric motor 1961, a rotating link 1964 that is rotated by the rotational output of the gear box 1963, and connecting rod 1965 that is connected to the rotating link 1964 at an off-axis location relative to the rotational output of the gear box 1963. The connecting rod 1965 is configured as a two-force member that is eccentrically coupled to the rotational output of the gear box 1963 by the rotating link 1964. The connecting rod 1965 is connected to the rotating link 1964 by a pivoting joint or ball joint. The electric motor 1961 may be connected in a fixed manner to a first structure 1966 (e.g., a chassis) and the connecting rod 1965 may be connected by to a second structure 1967 (e.g., a body) by a pivoting joint or a ball joint.

As described above, one aspect of the present technology is controlling a suspension system of a vehicle to provide a comfortable ride for passengers of the vehicle. Some implementations of the present technology may include the gathering and use of data available from various sources to control operation of the suspension system and thereby improve the ride quality of the vehicle or customize the ride of the vehicle to the preferences of the passengers of the vehicle. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing a user of the vehicle may be collected and used to adjust the ride of the vehicle based on user preferences. As another example, the vehicle may include sensors that are used to control operation of the vehicle, and these sensors may obtain information (e.g., still pictures or video images) that can be used to identify persons present in the image.

The present disclosure recognizes that the use of such personal information data, in the present technology, can be used to the benefit of users. For example, the personal information data can be used to develop a user profile that describes user comfort levels for certain types of motion of the vehicle.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the identifying content to be displayed to users, the present technology can be configured to allow users to select to "opt in" or "opt out" of participation in the collection of personal information data during registration for services or anytime thereafter. In another example, users can select not to provide personal data for use in suspension control. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, customized suspension control can be performed using non-personal information data or a bare minimum amount of personal information, other non-personal information available to the devices, or publicly available information.

What is claimed is:
1. A vehicle, comprising:
    a chassis;
    a body;
    a chassis suspension system that is configured to connect the chassis to wheel and tire assemblies of the vehicle; and
    a body suspension system that connects the body to the chassis, wherein the body suspension system includes:
        passive suspension components that support the body with respect to the chassis between the body and the chassis, wherein the passive suspension components are positioned in a substantially rectangular configuration, and active suspension components that control motion of the body with respect to the chassis, wherein the active suspension components include:
a front pair of active suspension components positioned toward a front end of the body and a rear pair of active suspension components positioned toward a rear end of the body, wherein the front pair of active suspension components and the rear pair of active suspension components are operable to control motion of the body with respect to the chassis both vertically and laterally with respect to the vehicle; and
a left side pair of active suspension components positioned toward a left side of the body and a right side pair of active suspension components positioned toward a right side of the body, wherein the left side pair of active suspension components and the right side pair of active suspension components are operable to control motion of the body with respect to the chassis both vertically and longitudinally with respect to the vehicle.

2. The vehicle of claim 1, wherein the active suspension components of the body suspension system include eight or more active suspension actuators that are connected to the body and the chassis.

3. The vehicle of claim 1, wherein the active suspension components of the body suspension system include linear actuators that are pivotally connected to both the body and the chassis.

4. The vehicle of claim 1, wherein the active suspension components of the body suspension system include a ball screw actuator that advances and retracts an output shaft along a line of action by rotation of an electric motor.

5. The vehicle of claim 1, wherein the active suspension components of the body suspension system include a linear electric actuator that advances and retracts an output shaft along a line of action using a linear electric motor.

6. The vehicle of claim 1, wherein the active suspension components of the body suspension system include an electric motor and a connecting rod that is eccentrically coupled to a rotational output of the electric motor.

7. The vehicle of claim 1, wherein the chassis suspension system includes passive suspension components that are configured to dampen vibrations.

8. The vehicle of claim 1, wherein the chassis suspension system includes active suspension components that are configured to control motion of the chassis with respect to the wheel and tire assemblies.

9. The vehicle of claim 1, wherein the body defines a passenger compartment that is configured to carry passengers.

10. The vehicle of claim 1, wherein the body includes doors that allow for ingress and egress.

11. The vehicle of claim 1, wherein the chassis includes:
a battery box that holds battery cells,
a primary frame portion that supports the battery box, and
one or more electric propulsion motors that are powered by electrical power that is supplied by the battery cells.

12. A vehicle, comprising:
a chassis;
a body;
a first group of passive suspension components that are configured to support the chassis with respect to wheel and tire assemblies of the vehicle;

a second group of passive suspension components that support the body with respect to the chassis, wherein the second group of passive suspension components includes a first pair of passive suspension components and a second pair of passive suspension components;
active suspension components that are operable to control motion of the body with respect to the chassis in three linear degrees of freedom and three rotational degrees of freedom, wherein the active suspension components are positioned between the first pair of passive suspension components and the second pair of passive suspension components longitudinally along the body;
sensors that output motion signals that describe motion of the body and motion of the chassis; and
a controller that determines control signals for the active suspension components based on the motion signals from the sensors and causes the active suspension components to control motion of the body using the control signals.

13. The vehicle of claim 12, wherein the active suspension components are configured to dampen low-frequency motions.

14. The vehicle of claim 12, wherein the active suspension components include six or more active suspension actuators that are connected to the body and the chassis.

15. The vehicle of claim 12, wherein the active suspension components include linear actuators that are pivotally connected to both the body and the chassis.

16. The vehicle of claim 12, wherein the second group of passive suspension components includes air springs.

17. The vehicle of claim 12, wherein the second group of passive suspension components includes coil springs.

18. A suspension system, comprising:
a first group of passive suspension components that are configured to support a chassis of a vehicle with respect to wheel and tire assemblies of the vehicle;
a second group of passive suspension components that are configured to support a body of the vehicle with respect to the chassis, wherein the second group of passive suspension components includes a first pair of passive suspension components and a second pair of passive suspension components; and
active suspension components that are configured to control motion of the body with respect to the chassis in three linear degrees of freedom and three rotational degrees of freedom, wherein the active suspension components are configured to be positioned between the first pair of passive suspension components and the second pair of passive suspension components longitudinally along the body.

19. The suspension system of claim 18, wherein the active suspension components include six or more active suspension actuators that are configured to be pivotally connected to both the body and the chassis of the vehicle.

20. The suspension system of claim 18, wherein the active suspension components are configured to dampen low-frequency motions.

21. The suspension system of claim 18, wherein the second group of passive suspension components includes air springs.

22. The suspension system of claim 18, wherein the suspension system includes:
sensors that are configured to output signals that describe motion of the body and motion of the chassis; and
a controller that is configured to determine control signals for the suspension system based on the signals from the sensors and cause the suspension system to control motion of the body using the control signals.

* * * * *